(12) United States Patent
Adachi et al.

(10) Patent No.: US 6,508,133 B1
(45) Date of Patent: Jan. 21, 2003

(54) ULTRASONIC FLOWMETER AND ULTRASONIC GENERATOR/DETECTOR

(75) Inventors: Akihisa Adachi, Yamatokoriyama (JP); Atsushi Watanabe, Kawasaki (JP); Toshiharu Sato, Kawasaki (JP); Naoko Azuma, Kawasaki (JP); Masahiko Hashimoto, Tokyo (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/077,798

(22) PCT Filed: Dec. 12, 1996

(86) PCT No.: PCT/JP96/03629

§ 371 (c)(1),
(2), (4) Date: Nov. 24, 1998

(87) PCT Pub. No.: WO97/21985

PCT Pub. Date: Jun. 19, 1997

(30) Foreign Application Priority Data

Dec. 13, 1995 (JP) .............................................. 7-324223

(51) Int. Cl.⁷ ................................................ G01F 1/20
(52) U.S. Cl. ................................ 73/861.18; 73/861.29; 310/334
(58) Field of Search ................................ 73/861.18 OR, 73/861.12, 861.25, 861.26, 861.27, 862.28, 861.29, 861.31; 310/334, 335, 336, 337; 600/459

(56) References Cited

U.S. PATENT DOCUMENTS

| | | | | |
|---|---|---|---|---|
| 3,964,308 A | * | 6/1976 | Scarpa ...................... | 73/194 A |
| 4,156,158 A | | 5/1979 | Wilson et al. | |
| 5,052,230 A | * | 10/1991 | Lang et al. .............. | 73/861.28 |
| 5,164,920 A | | 11/1992 | Bast et al. | |
| 5,295,487 A | * | 3/1994 | Saitoh et al. .......... | 128/662.03 |
| 5,311,095 A | | 5/1994 | Smith et al. | |
| 5,351,560 A | | 10/1994 | Russwurm | |
| 5,381,385 A | * | 1/1995 | Greenstein .................. | 367/140 |
| 5,460,047 A | | 10/1995 | Jacobson | |
| 5,617,865 A | * | 4/1997 | Palezewska et al. ... | 128/662.03 |
| 5,976,090 A | * | 11/1999 | Hanafy et al. .............. | 600/459 |
| 6,026,693 A | * | 2/2000 | Baumoel et al. ......... | 73/861.27 |
| 6,036,647 A | * | 3/2000 | Suorsa et al. ................ | 600/459 |

FOREIGN PATENT DOCUMENTS

| | | |
|---|---|---|
| JP | 60-169716 | 9/1985 |
| JP | 60-192500 | 9/1985 |
| JP | 63-209634 | 8/1988 |
| JP | 3-112300 | 5/1991 |
| JP | 4-62519 | 10/1992 |
| JP | 5-223608 | 8/1993 |
| JP | 7-264697 | 10/1995 |

OTHER PUBLICATIONS

Japanese language search report for Int'l Appln No. PCT/JP96/03629 dated Mar. 18, 1997.
English translation of Japanese language search report.

* cited by examiner

*Primary Examiner*—Harshad Patel
(74) *Attorney, Agent, or Firm*—RatnerPrestia

(57) ABSTRACT

An ultrasonic flowmeter includes a flow passage and an ultrasonic transducer for measuring the flow rate in the flow passage wherein the ultrasonic transducer is equipped with a piezoelectric material having electrodes on the opposed surfaces thereof, one of which is used as an ultrasonic wave transmitting/receiving surface and faces the flow passage. The lengths of the sides of the transmitting/receiving surface is so determined that the vibration in the electrode direction is the main mode, preferably that the ratio of the lengths of the sides of the transmission/reception surface to the thickness is not greater than 0.8. Consequently, because the flow meter uses the thickness longitudinal vibration of the piezoelectric material as the main mode, the ultrasonic transducer has a high sensitivity, a high speed response and a small size and the ultrasonic flow meter has a high accuracy and is compact.

38 Claims, 14 Drawing Sheets

(a)

(b)

(c)

(a)

(b)

(c)

(d)

ULTRASONIC FLOWMETER AND ULTRASONIC GENERATOR/DETECTOR

THIS APPLICATION IS A U.S. NATIONAL PHASE APPLICATION OF PCT INTERNATIONAL APPLICATION PCT/JP96/03629.

TECHNICAL FIELD

The present invention relates to an ultrasonic flowmeter for measuring the flow rate of a fluid and an ultrasonic transducer used therein, by disposing a pair of ultrasonic transducer sets at the upstream side and downstream side of the fluid each, transmitting an ultrasonic wave from one ultrasonic transducer, and receiving by other ultrasonic transducer.

BACKGROUND ART

Traditionally the technology for measuring the flow rate of a fluid flowing in a piping by using ultrasonic wave has been developed. An ultrasonic flowmeter is known in a constitution as disclosed as "Trial fabrication of ultrasonic flow meter for gas" in Measurement Research Report Vol. 26, No. 1, pp. 1–6, Japan.

Conventional ultrasonic flowmeter and ultrasonic transducer are described below.

FIG. 20 shows a constitution of a conventional ultrasonic flowmeter, and FIG. 21 shows a constitution of a conventional ultrasonic transducer for gas. In FIG. 20, reference numeral 51 is a cylindrical tube, 52 is an ultrasonic transducer A, 53 is a mounting port A for mounting the ultrasonic transducer A 52 on the cylindrical tube 51, 54 is an ultrasonic transducer B, 55 is a mounting port B for mounting the ultrasonic transducer B 54 on the cylindrical tube 51, and 56 is a fluid to be measured flowing in the cylindrical tube 51. In FIG. 21, reference numeral 57 is a cylindrical piezoelectric plate, 58 is a matching layer, and 59 is a lead wire.

In thus composed ultrasonic flowmeter, the constitution is described below.

Through the mounting port A 53 and mounting port B 55, the ultrasonic transducer A 52 and ultrasonic transducer B 54 are mounted on the cylindrical tube 51 obliquely opposite to each other. Supposing the distance between the ultrasonic transducer A 52 and ultrasonic transducer B 54 to be L, the angle formed between the longitudinal direction of the cylindrical tube 51 and propagation direction of ultrasonic wave to be θ, the sound velocity of ultrasonic wave propagating through the fluid 56 in windless state to be C, and the flow velocity of the fluid 56 to be V, the propagation time t1 of the ultrasonic wave transmitted from the ultrasonic transducer A 52 propagating through the fluid 56 until received by the ultrasonic transducer B 54 is expressed as follows.

$$C + V\cos\theta = \frac{L}{t1} \quad \text{(Formula 1)}$$

Similarly, the propagation time t2 of the ultrasonic wave transmitted from the ultrasonic transducer B 54 propagating through the fluid 56 until received by the ultrasonic transducer A 52 is expressed as follows.

$$c - V\cos\theta = \frac{L}{t2} \quad \text{(Formula 2)}$$

Canceling the sound velocity C of the fluid 56 from the two formulas, the following expression is obtained.

$$\frac{1}{t1} - \frac{1}{t2} = \frac{2V\cos\theta}{L} \quad \text{(Formula 3)}$$

From the above formula, the flow velocity V of the fluid 56 is obtained as follows:

$$V = \frac{L}{2\cos\theta}\left(\frac{1}{t1} - \frac{1}{t2}\right) \quad \text{(Formula 4)}$$

Since this expression does not include the sound velocity C of the fluid 56, the flow velocity V is obtained regardless of the material of the fluid 56, and the flow rate is deduced from the obtained flow velocity V and the sectional area of the cylindrical tube 51. The ultrasonic transducer used when the fluid 56 is gas is cylindrical in shape as shown in FIG. 21, and comprises a cylindrical piezoelectric plate 57 and a single matching layer 58.

Such conventional constitution, however, involves the following problems.

(1) In a first problem, since the piezoelectric plate used in the ultrasonic transducer is cylindrical, when the thickness vibration or radial vibration of a disk is utilized, if a low frequency is selected, the diameter becomes large, and the ultrasonic transducer is large in size, so that the ultrasonic flowmeter cannot be reduced in size. When using the ultrasonic transducer of small size, the frequency must be high, and effects of attenuation due to propagation of ultrasonic wave are significant, which causes to increase the cost of circuit of the ultrasonic flowmeter. Accordingly, when an ultrasonic transducer of a proper size suited to the ultrasonic flowmeter is selected, the selection of the frequency is limited. Moreover, the electromechanical coupling coefficient of thickness vibration of disk is Kt, and the electromechanical coupling coefficient of radial vibration is Kp, which were smaller than the electromechanical coupling coefficient of longitudinal vibration of K33, and hence the sensitivity was low. Yet, since the cylindrical piezoelectric plate 57 was not provided with constituent material such as backing layer for lowering the mechanical Q, only ultrasonic pulses of long ringing could be transmitted, and it was hard to shorten the flow rate measuring time.

(2) In a second problem, since the section of the cylindrical tube 51 is circular, in spite of the two-dimensional flow velocity distribution in which the flow velocity V near the center is fast and the flow velocity V of the outer side is slow, at the flow velocity V obtained by two confronting sets of ultrasonic transducer, it is hard to reflect the flow velocity distribution of the entire section of the cylindrical tube 51, and the average flow velocity is only in the measuring region in the section of the cylindrical tube 51. Since the flow rate in the cylindrical tube 51 is determined from the measured flow velocity V by using an approximate formula, it is hard to estimate the flow velocity distribution at high precision, and it is hard to obtain a high precision of measurement of flow rate.

OBJECT OF THE INVENTION

The invention is to solve the problems of the prior art, and it is an object thereof to present a compact ultrasonic flowmeter and ultrasonic transducer, advanced in degrees of freedom of selection of dimensions and frequency of ultrasonic transducer, high in sensitivity, and excellent in high speed response and precision.

DISCLOSURE OF THE INVENTION

The invention includes a flow passage, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are electrically connected through conductors.

An ultrasonic flowmeter according to a first aspect of the invention includes a flow passage, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are electrically connected through conductors, and the piezoelectric material, by dividing at least one of the transmitting/receiving surface and the surface confronting this transmitting/receiving surface into plural sections, is capable of separating the longitudinal vibration and undesired vibration mode, and therefore the ultrasonic transducer of high sensitivity, fast response, wide selection range of frequency and dimensions and small size is obtained, so that the ultrasonic flowmeter of high accuracy and compact size is realized.

An ultrasonic flowmeter according to a second aspect of the invention includes a parallel flow passage having a gap of a specified height at a specified position and having a specified width, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are electrically connected through conductors, and the piezoelectric material, by dividing at least one of the transmitting/receiving surface and the surface confronting this transmitting/receiving surface into plural sections, is capable of separating the longitudinal vibration and undesired vibration mode, and therefore the ultrasonic transducer of high sensitivity, fast response, wide selection range of frequency and dimensions and small size is obtained, and moreover by forming the cross section of the flow passage into a rectangular form, the flow velocity distribution in the section of the flow passage can be simplified, and the flow rate can be deduced at high accuracy from the obtained flow velocity, so that the ultrasonic flowmeter of high accuracy is realized.

An ultrasonic flowmeter according to a third aspect of the invention includes a flow passage, and an ultrasonic transducer disposed for measuring the flow rate of the fluid in this flow passage, in which the ultrasonic transducer comprises plural piezoelectric materials having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are individually connected with conductors, and the conductors are sufficiently thin as compared with the wavelength of the ultrasonic wave generated from the ultrasonic transducer, and hence the piezoelectric material, by dividing at least one of the transmitting/receiving surface and the surface confronting this transmitting/receiving surface into plural sections, is capable of separating the thickness longitudinal vibration and undesired vibration mode, while the electrodes can be connected without having effects on the characteristic of the ultrasonic transducer and handling of the piezoelectric material is easy, and therefore the ultrasonic transducer of high sensitivity, fast response, wide selection range of frequency and dimensions and small size is obtained, so that the ultrasonic flowmeter of high accuracy is realized.

An ultrasonic flowmeter according to a fourth aspect of the invention includes a parallel flow passage having a gap of a specified height at a specified position and having a specified width, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and the piezoelectric material divides at least one of the transmitting/receiving surface and the surface confronting this transmitting/receiving surface into plural sections, and all of electrodes disposed on the divided section are electrically connected through conductors, and the conductors are sufficiently thin as compared with the wavelength of the ultrasonic wave generated from the ultrasonic transducer, and hence the piezoelectric material, by dividing at least one of the transmitting/receiving surface and the surface confronting this transmitting/receiving surface into plural sections, is capable of separating the longitudinal vibration and undesired vibration mode, while the electrodes can be connected without having effects on the characteristic of the ultrasonic transducer and handling of the piezoelectric material is easy, and therefore the ultrasonic transducer of high sensitivity, fast response, wide selection range of frequency and dimensions and small size is obtained, and moreover by forming the cross section of the flow passage into a rectangular form, the flow velocity distribution in the section of the flow passage can be simplified, and the flow rate can be deduced at high accuracy from the obtained flow velocity, so that the ultrasonic flowmeter of high accuracy is realized.

In the ultrasonic flowmeter of the fourth aspect, when the conductors are composed in a cylindrical case with a top incorporating the piezoelectric material and having the ceiling electrically connected with all of electrodes disposed on the divided section of the piezoelectric material, in an electric charge is accumulated in the piezoelectric y material to spark, since the piezoelectric material is incorporated in the cylindrical case with a top having the ceiling, the safety can be assured if the fluid to be measured is flammable gas or flammable liquid, and an accurate and compact ultrasonic flowmeter of high safety is obtained.

An ultrasonic flowmeter according to a fifth aspect of the invention relates to the ultrasonic flowmeter of the first to fourth aspects, in which at least one of the transmitting/receiving surface of the piezoelectric material and the surface confronting this transmitting/receiving surface is divided into plural sections by forming a groove, and the thickness longitudinal vibration and undesired vibration mode can be separated by this groove, and therefore the ultrasonic transducer of high sensitivity, fast response, wide selection range of frequency and dimensions and small size is obtained, so that the ultrasonic flowmeter of high accuracy and compact size is realized.

In the ultrasonic flowmeter of the fifth aspect, the groove divides the piezoelectric material in such a depth that the vibration in the electrode direction vertical to the transmitting/receiving surface may be the main mode, and the depth of the groove is 90% or more and less than 100% of the thickness in the direction vertical to the transmitting/receiving surface, and therefore the piezoelectric material is not separated completely, and it is easy to handle the piezoelectric material, and moreover the thickness longitudinal vibration and the undesired vibration mode can be separated to degrees free from practical problem, and therefore the ultrasonic transducer of high sensitivity, fast response, wide selection range of frequency and dimensions and small size is obtained, so that the ultrasonic flowmeter of high accuracy and compact size is realized.

Also in the ultrasonic flowmeter of the fifth aspect, the lengths of the longitudinal and lateral sides divided by the groove are set so that the vibration in the direction vertical to the transmitting/receiving surface may be the main mode, and the ratio of the lengths of the longitudinal and lateral sides divided by the groove to the thickness is all 0.8 or less, and therefore the longitudinal vibration and the undesired vibration mode can be separated to degrees free from practical problem and the thickness longitudinal vibration can be used as the main mode, and therefore the ultrasonic transducer of high sensitivity, fast response, wide selection range of frequency and dimensions and small size is obtained, so that the ultrasonic flowmeter of high accuracy and compact size is realized.

Further in the ultrasonic flowmeter of the fifth aspect, plural grooves are provided in the piezoelectric material, and therefore the ultrasonic transducer of small size, being much wider in the selection range of frequency and dimensions, is obtained, so that the ultrasonic flowmeter of high accuracy and compact size is realized.

An ultrasonic flowmeter according to a sixth aspect of the invention includes a flow passage, and an ultrasonic transducer disposed for measuring the flow rate of the fluid in this flow passage, in which the ultrasonic transducer comprises plural piezoelectric materials having electrodes on the opposed surfaces thereof, one of which is used as a transmitting/receiving surface, with this transmitting/receiving surface facing the flow passage, and each piezoelectric material is disposed so that at least one of the transmitting/receiving surface and the surface confronting this transmitting/receiving surface is divided into plural sections, and all of electrodes disposed on the transmitting/receiving surface of each piezoelectric material and the surface confronting this transmitting/receiving surface are electrically connected through conductors, and since plural divided piezoelectric materials are provided, effects of undesired vibration mode are small, and therefore the ultrasonic transducer of high sensitivity, fast response, wide selection range of frequency and dimensions and small size is obtained, so that the ultrasonic flowmeter of high accuracy and compact size is realized.

In the ultrasonic flowmeter of the sixth aspect, the flow passage is a parallel flow passage having a gap of a specified height at a specified position and having a specified width, and since the sectional shape of the flow passage is formed into a rectangular form, the flow velocity distribution in the section of the flow passage can be simplified, and the flow rate can be deduced at high accuracy from the obtained flow velocity, so that the ultrasonic flowmeter of high accuracy is realized.

Also in the ultrasonic flowmeter of the sixth aspect, the conductors are sufficiently thin as compared with the wavelength of the ultrasonic wave generated from the ultrasonic transducer, and hence the electrodes can be connected without having effects on the characteristic of the ultrasonic transducer and handling of the piezoelectric material is easy, and therefore the ultrasonic transducer of high sensitivity and small size is obtained, so that the ultrasonic flowmeter of high accuracy is realized.

Further in the ultrasonic flowmeter of the sixth aspect, the all lengths of the longitudinal and lateral sides of the transmitting/receiving surface of each piezoelectric material are set so that the vibration in the electrode direction vertical to the transmitting/receiving surface may be the main mode, and the ratio of the lengths of the longitudinal and lateral sides of the transmitting/receiving surface of each piezoelectric material to the thickness is all 0.8 or less, and therefore the longitudinal vibration can be used as the main mode, and therefore the ultrasonic transducer of high sensitivity, fast response, wide selection range of frequency and dimensions and small size is obtained, so that the ultrasonic flowmeter of high accuracy and compact size is realized.

An ultrasonic flowmeter according to a seventh aspect of the invention relates to the ultrasonic flowmeter of the first to sixth aspects, in which an acoustic matching layer is disposed on the transmitting/receiving surface of the ultrasonic transducer, and transmitting/receiving of ultrasonic waves with the fluid is easier, and the ultrasonic transducer of high accuracy is obtained, so that the ultrasonic flowmeter of higher accuracy is realized.

An ultrasonic flowmeter according to an eighth aspect of the invention relates to the ultrasonic flowmeter of the first to seventh aspects, in which a backing layer is disposed on the surface confronting the transmitting/receiving surface of the ultrasonic transducer, and the ultrasonic transducer capable of transmitting and receiving ultrasonic pulses of short ringing time can be obtained, so that the ultrasonic flowmeter of higher accuracy is realized.

An ultrasonic transducer according to a first aspect of the invention includes a piezoelectric material having electrodes on the opposed surfaces thereof, one of which is used as a transmitting/receiving surface, in which each piezoelectric material is divided by a groove at least in one of the transmitting/receiving surface and the surface confronting the transmitting/receiving surface so that the ratio of the lengths of longitudinal and lateral sides of the transmitting/receiving surface of each piezoelectric material to the thickness is all 0.6 or less, all of electrodes disposed on the divided section are electrically connected with conductors, and the thickness longitudinal vibration and undesired vibration mode can be separated to degrees free from practical problems, and the thickness longitudinal vibration can be used as the main mode, so that an ultrasonic transducer of high sensitivity, fast response, wide selection range of frequency and dimensions and small size is obtained.

An ultrasonic transducer according to a second aspect of the invention includes a piezoelectric material having electrodes on the opposed surfaces thereof, one of which is used as a transmitting/receiving surface, in which the piezoelectric material divides at least one of the transmitting/receiving surface and the surface confronting this transmitting/ receiving surface by a groove, the depth of the groove is 90% or more and less than 100% of the thickness enclosed by the surfaces on which the electrodes are disposed, and all of electrodes on the surfaces divided by the groove are connected electrically with conductors, and since the piezoelectric material is not separated completely, handling of the piezoelectric material is easy, and therefore the thickness longitudinal vibration and the undesired vibration mode can be separated by the groove, so that an ultrasonic transducer of high sensitivity, fast response, wide selection range of frequency and dimensions and small size is obtained.

In the ultrasonic transducer of the second aspect, when the ratio of the lengths of longitudinal and lateral sides of the transmitting/receiving surface of the divided piezoelectric material to the thickness is all 0.6 or less, the thickness longitudinal vibration and the undesired vibration mode can be separated to such an extent free from practical problem and the thickness longitudinal vibration can be used as the main mode, so that an ultrasonic transducer of high sensitivity, fast response, wide selection range of frequency and dimensions and small size is obtained.

An ultrasonic transducer according to a third aspect of the invention includes a plurality of piezoelectric materials having electrodes on the opposed surfaces thereof, one of which is used as a transmitting/receiving surface, in which each piezoelectric material is disposed so that at least one of the transmitting/receiving surface and the surface confronting this transmitting/receiving surface is divided into plural sections, the ratio of the lengths of longitudinal and lateral sides of the transmitting/receiving surface of each piezoelectric material to the thickness is all 0.6 or less, and the electrodes on the transmitting/receiving surface and on the confronting surface are individually connected with conductors, and since plural separated piezoelectric materials are used, the longitudinal vibration can be used as the main mode without significant effect of the undesired vibration mode, so that an ultrasonic transducer of high sensitivity, fast response, wide selection range of frequency and dimensions and small size is obtained.

An ultrasonic transducer according to a fourth aspect of the invention relates to the ultrasonic transducer of the first and second aspects, in which the conductors are sufficiently thinner conductors as compared with the wavelength of the ultrasonic wave from the ultrasonic transducer, and the electrodes can be connected without having effects on the characteristics of the ultrasonic transducer, and handling of piezoelectric material is easier, so that an ultrasonic transducer of high accuracy and small size is obtained.

In the ultrasonic transducer of the fourth aspect, when the conductors are composed in a cylindrical case with a top incorporating the piezoelectric material and having the ceiling electrically connected with all of electrodes disposed on the divided section of the piezoelectric material, in an electric charge is accumulated in the piezoelectric material to ignite a spark, since the piezoelectric material is incorporated in the cylindrical case with a top having the ceiling, the safety can be assured if the propagation medium contacting with the ultrasonic transducer is flammable gas or flammable liquid, and an accurate and small ultrasonic transducer of high safety is obtained.

An ultrasonic transducer according to a fifth aspect of the invention relates to the ultrasonic transducer of the first and second aspects, in which plural grooves are provided in the piezoelectric material, so that the ultrasonic transducer of wider selection range of frequency and dimensions and small size is obtained.

An ultrasonic transducer according to a sixth aspect of the invention relates to the ultrasonic transducer of the first to fifth aspects, in which an acoustic matching layer is disposed on the transmitting/receiving surface of the ultrasonic transducer, and exchange of ultrasonic waves with the fluid to be measured is easier, so that an ultrasonic transducer of high accuracy is obtained.

An ultrasonic transducer according to a seventh aspect of the invention relates to the ultrasonic transducer of the first to sixth aspects, in which a backing layer is disposed on the surface confronting the transmitting/receiving surface of the ultrasonic transducer, so that an ultrasonic transducer capable of transmitting and receiving ultrasonic pulses of short ringing time is obtained.

BEST MODE OF CARRYING OUT THE INVENTION

Figure 1:
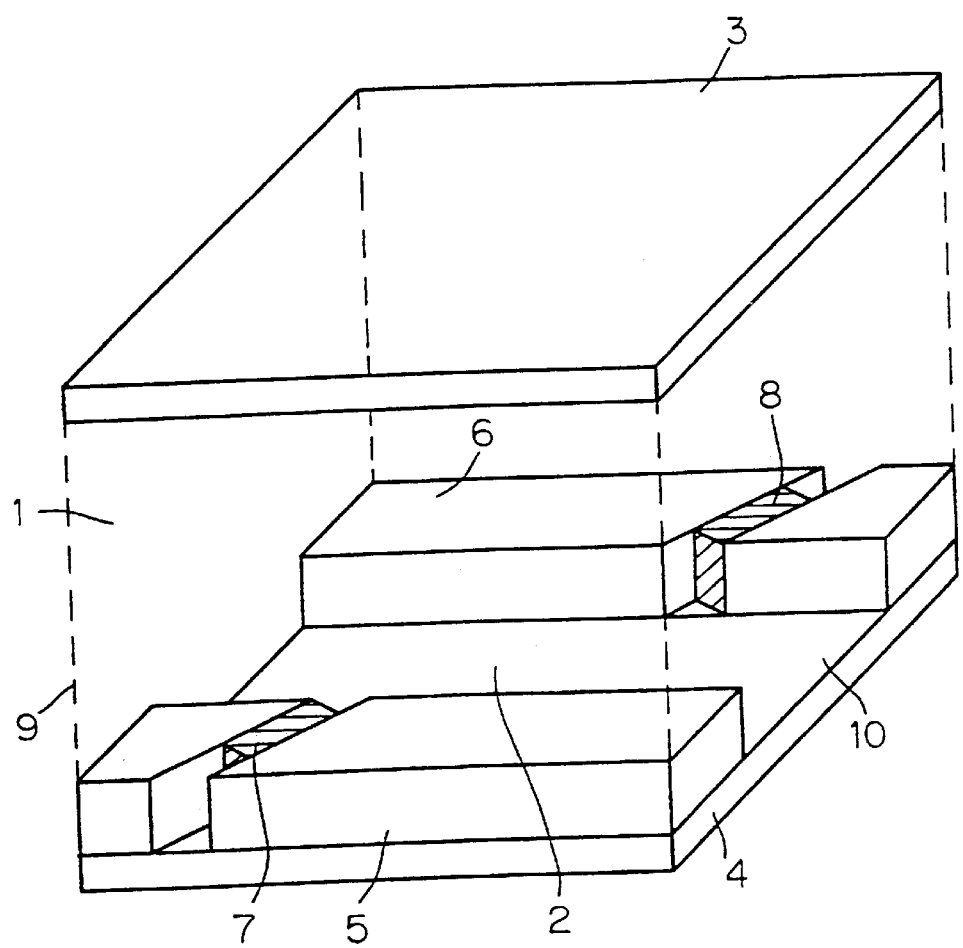
FIG. 1 is a diagram showing a constitution of an ultrasonic flowmeter in a first embodiment of the invention.

A first embodiment of the invention is described below while referring to the drawings.

(1) Embodiment 1

Figure 2:
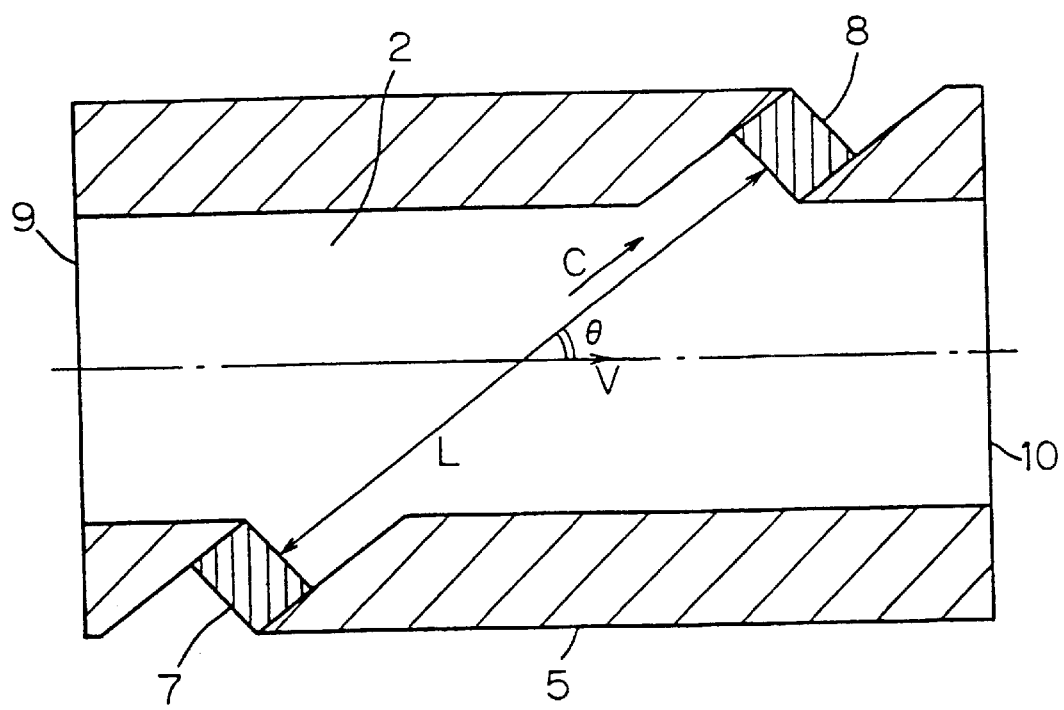
FIG. 2 is a diagram showing a configuration of ultrasonic transducer in a flow passage in the first embodiment of the same.

FIG. 1 is a schematic diagram of a flow rate detecting unit of an ultrasonic flowmeter in a first embodiment of the invention. In FIG. 1, reference numeral 1 is air which is a fluid to be measured, 2 is a flow passage of the air 1 flowing at flow velocity V, 3, 4, 5, 6 are top plate, bottom plate, side plate a, side plate B for composing the flow passage 2, 7 is an ultrasonic transducer A disposed on the side plate A 5, 8 is an ultrasonic transducer B disposed on the side plate B 6, 9 is an inlet side of the flow passage 2, and 10 is an outlet side of the flow passage 2. FIG. 2 is a top view of FIG. 1, showing the configuration of ultrasonic transducer.

An example of manufacturing method of the flow rate detecting unit of thus constituted ultrasonic flowmeter is briefly described below while referring to FIG. 1 and FIG. 2. Materials used in the top plate 3, bottom plate 4, side plate A 5, side plate B 6 for composing the flow passage 2 are flat plates of any material not causing chemical changes in the presence of the fluid to be measured. In this embodiment, the fluid to be measured is, for example, air 1, and acrylic plates are selected as the material conforming to the above condition and as insulator. The side plate A 5 and side plate B 6 are preliminarily divided in two sections obliquely, considering the angle for mounting the ultrasonic transducer. The side plate A 5 and side plate B 6 divided in two sections are adhered on the bottom plate 4 with, for example, an epoxy adhesive so as to form a groove in a width for mounting the ultrasonic transducer. At this time, in a width equivalent to the groove width, for example, a Teflon square bar in a length for penetrating both grooves in the side plate A 5 and side plate B 6 is inserted as positioning bar into the grooves provided in the side plate A 5 and side plate B 6 instead of the ultrasonic transducer. Above the side plate A 5 and side plate B 6, the top plate 3 is adhered with, for example, epoxy resin adhesive, and the flow passage 2 is composed. Removing the preliminarily inserted positioning bar, the ultrasonic transducer A 7 is inserted into the groove of the side plate A 5, and the ultrasonic transducer B 8 into the side plate B 6. The ultrasonic transducer and the ultrasonic transducer B 8 are adhered and fixed with the epoxy resin adhesive at the positions symmetrical about the center of the flow passage 2 and parallel to the top plate 3. However, the ultrasonic transducer A 7 and the ultrasonic transducer B 8 are disposed to the side plate A 5 and the side plate B 6 so as not to be obstacles in the flow passage 2. Moreover, the adhesive is injected to enclose so that the air 1 flowing in the flow passage 2 may not escape from the grooves formed in the side plates or the gap formed between the two sets of ultrasonic transducer.

Figure 3:
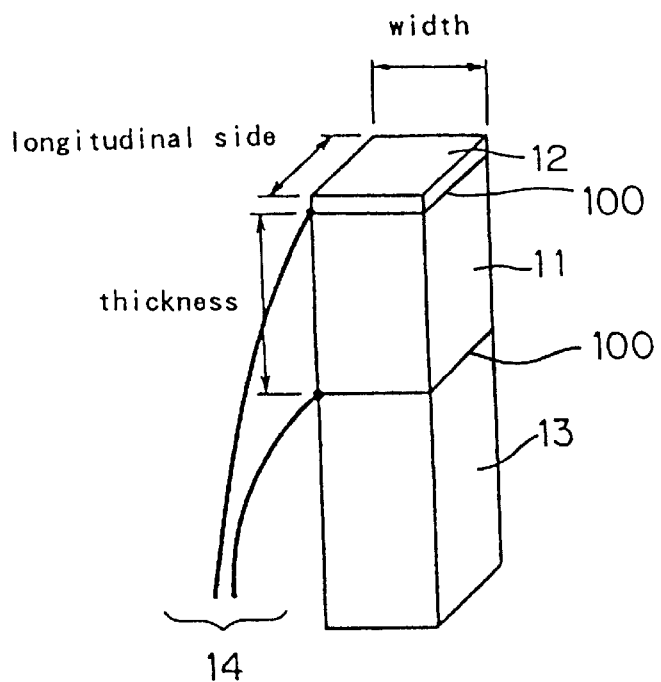
FIG. 3 is a diagram showing a constitution of the ultrasonic transducer in the first embodiment of the same.

An example of fabricating method of ultrasonic transducer used in the flow rate detecting unit of thus composed ultrasonic flowmeter is briefly explained by referring to FIG. 3. A piezoelectric plate 11 for converting the electric signal and mechanical vibration of the ultrasonic transducer has plural vibration modes depending on the shape and dimension, and of these plural vibration modes, the most efficient vibration mode is the thickness longitudinal vibration, and by using the longitudinal vibration as the main mode, an ultrasonic transducer of high sensitivity is obtained.

Herein, as a result of piezoelectric analysis by the finite element method in order to study the dimensional relation of the lengths of the longitudinal and lateral sides of the surface as the transmitting/receiving surface of the piezoelectric plate 11 to the thickness, when the piezoelectric plate 11 is a rectangular parallelepiped and the shape of the ultrasonic transmitting/receiving surface is a rectangle, it is all right as far as the lengths of the longitudinal and lateral sides of the transmitting/receiving surface of the piezoelectric plate 11 are smaller than the thickness, but if the ratio of the longitudinal side to the thickness is 0.6 or less and the ratio of the width to the thickness is 0.6 or less, it is known that the piezoelectric plate 11 performs the most efficient longitudinal vibration without effect of undesired vibration mode. For example, lead wires 14 are soldered on the electrode surfaces formed by silver baking on the upper and lower side of the piezoelectric plate 11 in the above shape composed of piezoelectric ceramic. Next, for propagating the ultrasonic wave efficiently to the air 1 by maintaining acoustic matching between the air 1 and piezoelectric plate 11, a matching layer 12 composed of, for example, polyolefin fine porous film is adhered on the upper side of the piezoelectric plate 11 by using, for example, an epoxy adhesive. Moreover, in order to obtain ultrasonic pulses of short ringing and quick in rise, at the lower side of the piezoelectric plate 11, a backing layer 13 composed of, for example, ferrite rubber is adhered by using, for example, an epoxy adhesive, thereby fabricating an ultrasonic transducer.

In thus constituted ultrasonic flowmeter using the flow rate detecting unit, the operation is described below. The angle formed by the line linking the centers of the ultrasonic transducer A 7 and ultrasonic transducer B 8 disposed at the side plate A 5 and side plate B 6 and the longitudinal direction of the flow passage 2 is supposed to be θ, and the distance between the ultrasonic transducer and ultrasonic transducer B 8 to be L. The ultrasonic transducer A 7 and ultrasonic transducer B 8 are connected to the driver unit, receiver unit, and flow rate analysis unit, which are not shown, through lead wires 14. The height which is the interval of the top plate 3 and bottom plate 4 of the flow passage 2, and the length of at least the shorter side of the ultrasonic transmitting/receiving surface of the piezoelectric material 11 are equal to each other.

The air 1 which is the fluid to be measured flows into the flow passage 2 from the inlet side 9, and flows out from the outlet side 10. The flow velocity distribution of the air 1 flowing in the flow passage 2 of which cross section is a rectangle is simple as compared with the case of which cross section is a circle, and the distribution in the height direction is small, and it has a distribution in the direction of the shorter axis. Supposing the flow velocity of the air 1 in the flow passage 2 to be V and the sound velocity of the air 1 in the windless state to be C, as shown in the prior art, the time t1 of the ultrasonic wave transmitted from the ultrasonic transducer A 7 propagating through the air 1 until received by the ultrasonic transducer B is expressed in formula 1. Similarly, the time t2 of the ultrasonic wave transmitted from the ultrasonic transducer B 8 propagating through the air 1 until received by the ultrasonic transducer A 7 is expressed in formula 2. Canceling the sound velocity C of the air 1 from formula 1 and formula 2, formula 3 is obtained. From the above formula, the flow velocity V of the air 1 is obtained as shown in formula 4.

By transmitting the ultrasonic wave from the ultrasonic transducer A 7 and receiving in the ultrasonic transducer B 8, and by transmitting the ultrasonic wave from the ultrasonic transducer B 8 and receiving in the ultrasonic transducer A 7, repeatedly, the flow velocity V of the air 1 is measured in the above formulas, so that the flow rate is deduced in the flow rate analysis unit which is not shown.

Herein, since the height of the flow passage 2 and the shorter side of the transmitting/receiving surface, that is, the ultrasonic transmitting/receiving surface of the ultrasonic transducer A 7 and ultrasonic transducer B 8 are equal, the ultrasonic wave transmitted and received in the ultrasonic transducer A 7 and ultrasonic transducer B 8 can obtain all information about the flow in the height direction of the flow passage 2. Accordingly, if there is distribution or disturbance in the flow in the flow passage 2, such effect can be eliminated.

Thus, according to the embodiment, in the flow passage 2 of which cross section is a rectangle, by oppositely disposing the ultrasonic transducer A 7 and ultrasonic transducer B 8 comprised of the piezoelectric plate 11 of which ratio of longitudinal side to the thickness is 0.6 or less and ratio of width to the thickness is 0.6 or less, matching layer 12 and backing layer 13, the flow rate of the air 1 flowing in the flow passage 2 can be measured at high accuracy in a short time.

In the first embodiment, the fluid to be measured is air, but the fluid to be measured may be other gas than air or liquid. Or the cross section of the flow passage 2 is a rectangle, but it may be formed in a circular shape, and the top plate 3 and bottom plate 4, and the side plate A 5 and side plate B 6 are not always required to be parallel to each other. The height of the flow passage 2 and the shorter side of the transmitting/receiving surface are supposed to be equal, but they may not be always equal. The ultrasonic transducer is used in the flow rate detection unit of the ultrasonic flowmeter, but the ultrasonic transducer for air or water used in an open space may be also used. The backing layer 13 is provided, but if an ultrasonic transducer of higher accuracy is needed in the condition for driving at low voltage, the backing layer 13 is not needed. The electrodes of the sides on the ultrasonic transmitting/receiving surface of the piezoelectric plate 11 and the confronting surface are not required on all surfaces. The matching layer 12 is a polyolefin porous film, but any other acoustic matching material may be used as far as suited to the fluid to be measured. Ferrite rubber is used for the backing layer 13, but any other material may be used as far as undesired vibration can be attenuated.

(2) Embodiment 2

A second embodiment of the invention is described below while referring to the drawing.

Figure 4:
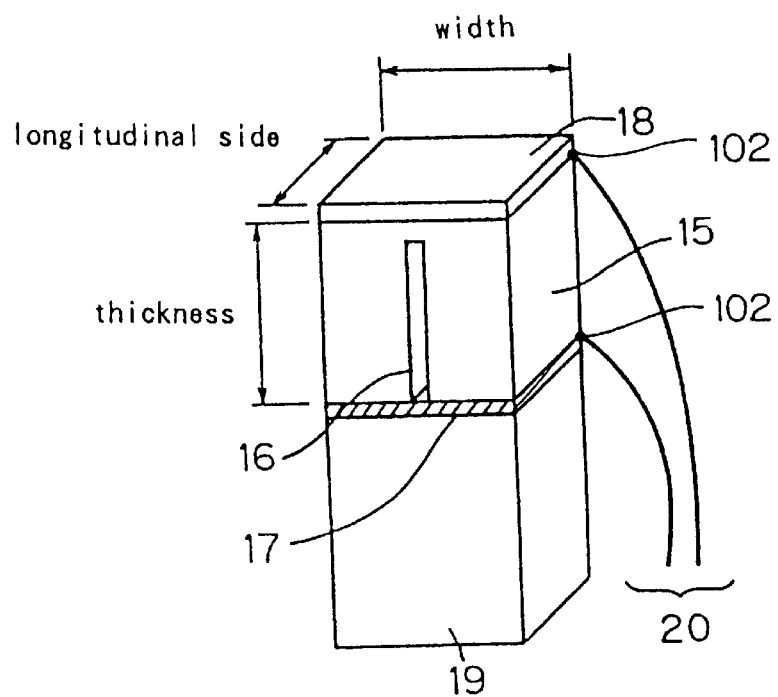
FIG. 4 is a diagram showing a constitution of an ultrasonic transducer in a second embodiment of the same.

FIG. 4 is a schematic structural diagram of an ultrasonic transducer used in an ultrasonic flow meter in the second embodiment of the invention. In FIG. 4, reference numeral 18 is a matching layer, 19 is a backing layer, and 20 is a lead wire, and the constitution is so far same as in FIG. 3. What differs from the constitution in FIG. 3 is as follows: in the piezoelectric plate 15 being 0.6 or more in either the ratio of the longitudinal side to the thickness or the ratio of the width to the thickness, a groove 16 in a depth of 90% or more and less than 100% of thickness is provided to divide the piezoelectric plate 15 into two sections so that the ratio of the longitudinal side to the thickness in the shape of the electrode surface is 0.6 or less and that the ratio of the width to the thickness is 0.6 or less, the electrode divided into two sections is electrically connected to a conductor 17 so as to be one electrode same as the one before division, and a groove 16 is not filled with liquid or solid substance.

An example of fabricating method of thus constituted ultrasonic transducer is briefly described below by reference to FIG. 4. To design a compact ultrasonic flowmeter, allowable dimensions for the ultrasonic transducer are smaller. However, considering the characteristics of the ultrasonic transducer, the piezoelectric plate is desired to be as large as possible, and, for example, the piezoelectric plate 15 may be selected, which is made of a rectangular piezoelectric ceramic equal between the height of the flow passage 2 and the length of one side corresponding to the height of the flow passage of at least the ultrasonic transmitting/receiving surface. Accordingly, depending on the frequency to be used or the height of the flow passage 2, in the piezoelectric plate 15, the ratio of the longitudinal side to the thickness is not always 0.6 or less and the ratio of the width to the thickness is 0.6 or less. However, by using the piezoelectric plate 15 of which ratio of the longitudinal side to the thickness is over 0.6 or ratio of the width to the thickness is over 0.6, the thickness longitudinal vibration and other vibration mode are mixed, and the characteristic is impaired. In this embodiment, accordingly, in order to separate the longitudinal vibration and other vibration mode, the piezoelectric plate 15 is divided, and the longitudinal vibration and other vibration mode are separated. By forming a groove in a depth of 90% or more of the thickness of the piezoelectric plate, nearly the same effect is obtained as when the piezoelectric plate is separated completely, and therefore considering the handling of the piezoelectric plate 15, by using a dicing machine, for example, one groove 16 is machined in a depth of 90% or more and less than 100% of the thickness. However, the groove 16 is processed at a position so that the ratio of the longitudinal side to the thickness of each surface of the electrodes of the piezoelectric plate 15 divided in two sections may be 0.6 or less and the ratio of the width to the thickness may be 0.6 or less.

Consequently, two divided sections of the piezoelectric plate 15 and a conductor 17 made of copper foil of, for example, 0.02 mm in thickness and nearly equal in area to the piezoelectric plate 15 are adhered together while pressing by using, for example, an epoxy resin adhesive. When the adhesive layer is thin, an electric contact is achieved between the electrodes of the piezoelectric plate 15 and the conductor 17. To avoid coupling of vibration in the lateral direction, meanwhile, the groove 16 is not filled with liquid or solid substance. On the undivided surface of the conductor 17 and piezoelectric plate 15, a lead wire 20 is connected, for example, by soldering. The conductor 17 and a back load material 19 made of, for example, ferrite rubber is adhered with, for example, an epoxy resin adhesive. The undivided section of the piezoelectric plate 15 and a matching layer 18 made of, for example, polyolefin fine porous film are adhered with, for example, an epoxy resin adhesive, and an ultrasonic transducer is fabricated.

Thus fabricated ultrasonic transducer is high in sensitivity because the longitudinal vibration is the main mode in the piezoelectric plate 15 owing to the groove 16. Moreover, since the matching layer 18 and backing layer 19 are disposed, ultrasonic pulses of short ringing and quick rise can be transmitted.

The manufacturing method of the flow rate receiver unit of the ultrasonic flowmeter, and the operating method of the ultrasonic flowmeter for measuring the flow rate of the air 1 flowing in the flow passage 2 of a rectangular cross section by using the ultrasonic transducer A 7 and ultrasonic transducer B 8 are same as in embodiment 1, and are hence omitted herein.

Thus, according to this embodiment, in the piezoelectric plate 15 in a rectangular parallelepiped of which ratio of the longitudinal side to the thickness is 0.6 or more or ratio of the width to the thickness is 0.6 or more, by disposing a groove 16 of 90% or more and less than 100% of the thickness, the piezoelectric plate 15 is divided into two sections so that the ratio of the longitudinal side to the thickness of one electrode surface of the piezoelectric plate 15 may be 0.6 or less and the ratio of the width to the thickness may be 0.6 or less, and therefore the ultrasonic transducer of high sensitivity, fast response, wide selection range of frequency and dimensions and small size is obtained, and the flow rate of the air 1 flowing in the flow passage 2 may be measured at high accuracy in short time.

In the second embodiment, the ratio of the longitudinal side to the thickness of the ultrasonic transmitting/receiving surface of the piezoelectric plate 15 is 0.6 or more or the ratio of the width to the thickness is 0.6 or more, but the longitudinal and lateral dimensions of the transmitting/ receiving surface are not particularly defined as far as the vibration in the electrode direction is the main mode, and it does not matter if the ratio of the longitudinal side to the thickness is 0.6 or more and the ratio of the width to the thickness is 0.6 or more. Similarly, the depth of the groove may be set freely as far as the vibration in the electrode direction is the main mode. The longitudinal and lateral dimensions of the transmitting/receiving surface and the depth of the groove are same also in the following embodiments.

In addition, the groove 16 is not limited to one, but may be two or more. Instead of adhering the copper foil to the divided electrodes of the piezoelectric plate 15 by using the adhesive, a conductive lead wire may be soldered, or the conductor 17 thinner than the wavelength and the divided electrodes of the piezoelectric plate 15 may be electrically connected by using a conductive paste or the like. Instead of adhering the backing layer 19 to the conductor 17 adhered to the two divided surfaces of the piezoelectric plate 15, the conductor 17 and matching layer 18 may be adhered. Instead of using the ultrasonic transducer in the flow rate receiving unit of the ultrasonic flowmeter, it may be also used as the ultrasonic transducer for air or water used in an open space. To avoid vibration coupling in the lateral direction, the groove 16 is not filled with liquid or solid substance, but in order to increase the mechanical strength of the piezoelectric plate, the groove 16 may be filled with, for example, silicone rubber which is relatively hard to transmit the vibration.

In spite of the description herein, the height of the flow passage 2 is not always required to be equal to the length of at least one side corresponding to the height of the flow passage of the ultrasonic transmitting/receiving surface. The backing layer 19 is used herein, but the backing layer 19 is not always necessary if the ultrasonic transducer of higher sensitivity is needed in the condition of driving at low voltage. The electrodes are not required on all surfaces of the ultrasonic transmitting/receiving surface and the confronting surface of the piezoelectric plate 15. Although the piezoelectric plate 15 is a rectangular parallelepiped, but same effects are obtained in a cylindrical form. The groove 16, as far as it is possible to separate into the thickness longitudinal vibration and undesired vibration mode, is not always required to be disposed in the direction vertical to the plane of the electrodes of the piezoelectric plate 15. The matching layer 18 is made of polyolefin porous film, but any other acoustic matching material suited to the fluid to be measured may be used. Instead of ferrite rubber, the backing layer 19 may be made of any other material as far as the undesired vibration can be attenuated.

(3) Embodiment 3

A third embodiment of the invention is described below by reference to the drawing.

Figure 5:
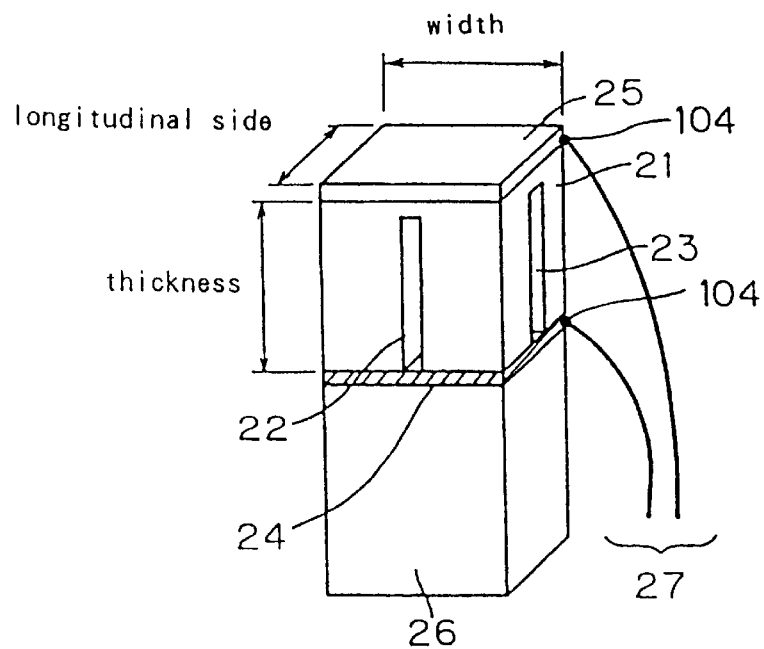
FIG. 5 is a diagram showing a constitution of an ultrasonic transducer in a third embodiment of the same.

FIG. 5 is a schematic structural diagram of an ultrasonic transducer used in an ultrasonic flowmeter in the third embodiment of the invention. In FIG. 5, reference numeral 25 is a matching layer, 26 is a backing layer, and 27 is a lead wire, and the constitution is so far same as in FIG. 3. What differs from the constitution in FIG. 3 is as follows: in a piezoelectric plate 21 being 0.6 or more in the ratio of the longitudinal side to the thickness and 0.6 or more in the ratio of the width to the thickness, a groove A 22 and a groove B 23 in a depth of 90% or more and less than 100% of thickness are provided to intersect in a cross form so that the ratio of the longitudinal side to the thickness in the shape of the electrode surface may be 0.6 or less, and that the ratio of the width to the thickness may be 0.6 or less, the divided electrodes are electrically connected to a conductor 24 so as to be in one electrode same as the one before division, and the groove A 22 and groove B 23 are not filled with liquid or solid substance.

An example of fabricating method of thus constituted ultrasonic transducer is briefly described below by reference to FIG. 5. To design a compact ultrasonic flowmeter, allowable dimensions for the ultrasonic transducer are smaller. However, considering the characteristics of the ultrasonic transducer, the piezoelectric plate is desired to be as large as possible, and, for example, the piezoelectric plate 21 may be selected, which is made of a square piezoelectric ceramic equal between the height of the flow passage 2 and the length of two sides of the ultrasonic transmitting/receiving surface. Accordingly, depending on the frequency to be used or the height of the flow passage 2, in the piezoelectric plate 21, the ratio of the longitudinal side to the thickness is not always 0.6 or less and the ratio of the width to the thickness is 0.6 or less. However, by using the piezoelectric plate 21 of which ratio of the longitudinal side to the thickness is over 0.6 or ratio of the width to the thickness is over 0.6, the longitudinal vibration and other vibration mode are mixed, and the characteristic is impaired. In this embodiment, too, in order to separate the thickness longitudinal vibration and other vibration mode, the piezoelectric plate 21 is divided, and the longitudinal vibration and other vibration mode are separated. By forming a groove in a depth of 90% or more of the thickness of the piezoelectric plate, nearly the same effect is obtained as when the piezoelectric plate is separated completely, and therefore considering the handling of the piezoelectric plate 21, by using a dicing machine, for example, groove A 22 and groove B 23 are machined in a depth of 90% or more and less than 100% of the thickness. However, the groove A 22 and groove B 23 are intersected near the center of one electrode surface of the piezoelectric plate 21, and processed in a cross so that the ratio of the longitudinal side to the thickness may be 0.6 or less and the ratio of the width to the thickness may be 0.6 or less in all electrodes surfaces divided into four sections. To avoid coupling of vibration in the lateral direction, however, the groove A 22 and groove B 23 are not filled with liquid or solid substance.

Consequently, four divided sections of the piezoelectric plate 21 and a conductor 24 made of copper foil of, for example, 0.02 mm in thickness and nearly equal in area to the piezoelectric plate 21 are adhered together while pressing by using, for example, an epoxy resin adhesive. When the adhesive layer is thin, an electric connection is achieved between the electrodes of the piezoelectric plate 21 and the conductor 24. To avoid coupling of vibration in the lateral direction, meanwhile, the groove A 22 and groove B 23 are not filled with liquid or solid substance. On the undivided surface of the conductor 24 and piezoelectric plate 21, a lead wire 27 is connected, for example, by soldering. The conductor 24 and a back load material 26 made of, for example, ferrite rubber are adhered with, for example, an epoxy resin adhesive. The undivided section of the piezoelectric plate 21 and a matching layer 25 made of, for example, polyolefin fine porous film are adhered with, for example, an epoxy resin adhesive, and an ultrasonic transducer is fabricated.

Thus fabricated ultrasonic transducer is high in sensitivity because the thickness longitudinal vibration is the main mode in the piezoelectric plate 21 owing to the groove A 22 and groove B 23. Moreover, since the matching layer 25 and backing layer 26 are disposed, ultrasonic waves of short ringing and quick rise can be transmitting.

The manufacturing method of the flow rate receiver unit of the ultrasonic flowmeter, and the operating method of the ultrasonic flowmeter for measuring the flow rate of the air 1 flowing in the flow passage 2 of a rectangular cross section by using the ultrasonic transducer A 7 and ultrasonic transducer B 8 are same as in embodiment 1, and are hence omitted herein.

Thus, according to this embodiment, in the piezoelectric plate 21 of which ratio of the longitudinal side to the thickness is 0.6 or more and ratio of the width to the thickness is 0.6 or more, by disposing the groove A 22 and groove B 23 of 90% or more and less than 100% of the thickness to intersect in a cross form so that the ratio of the longitudinal side to the thickness in the shape of the electrode surface may be 0.6 or less and the ratio of the width to the thickness may be 0.6 or less, the ultrasonic transducer of high sensitivity, fast response, wide selection range of frequency and dimensions and small size is obtained, and the flow rate of the air 1 flowing in the flow passage 2 may be measured at high accuracy in short time.

In the third embodiment, the ultrasonic transmitting/receiving surface of the piezoelectric plate 21 is square, but it may be also rectangular or cylindrical. Instead of adhering the copper foil to the divided electrodes of the piezoelectric plate 21 by using the adhesive, a lead wire may be soldered, or the conductor 24 thinner than the wavelength and the divided electrodes of the piezoelectric plate 21 may be electrically connected by using a conductive paste or the like. Instead of adhering the backing layer 26 to the conductor 24 adhered to the four divided surfaces of the piezoelectric plate 21, the conductor 24 and matching layer 25 may be adhered. Instead of using the ultrasonic transducer in the flow rate receiver unit of the ultrasonic flowmeter, it may be also used as the ultrasonic transducer for air or water used in an open space. The groove A 22 and groove B 23 are not filled with liquid or solid substance, but in order to increase the mechanical strength of the piezoelectric plate, the groove A 22 and groove B 23 may be filled with, for example, silicone rubber which is relatively hard to transmit the vibration.

In spite of the description herein, the height of the flow passage 2 is not always required to be equal to the length of at two sides of the ultrasonic transmitting/receiving surface. The backing layer 26 is used herein, but the backing layer 26 is not always necessary if the ultrasonic transducer of higher sensitivity is needed in the condition of driving at low voltage. The electrodes are not required on all surfaces of the ultrasonic transmitting/receiving surface and the confronting surface of the piezoelectric plate 21. The groove A 22 and groove B 23, as far as it is possible to separate into the thickness longitudinal vibration and undesired vibration mode, are not always required to be disposed in the direction vertical to the plane of the electrodes of the piezoelectric plate 21. The matching layer 25 is made of polyolefin porous film, but any other acoustic matching material suited to the fluid to be measured may be used. Instead of ferrite rubber, the backing layer 26 may be made of any other material as far as the undesired vibration can be attenuated.

(4) Embodiment 4

A fourth embodiment of the invention is described below by reference to the drawing.

Figure 6:
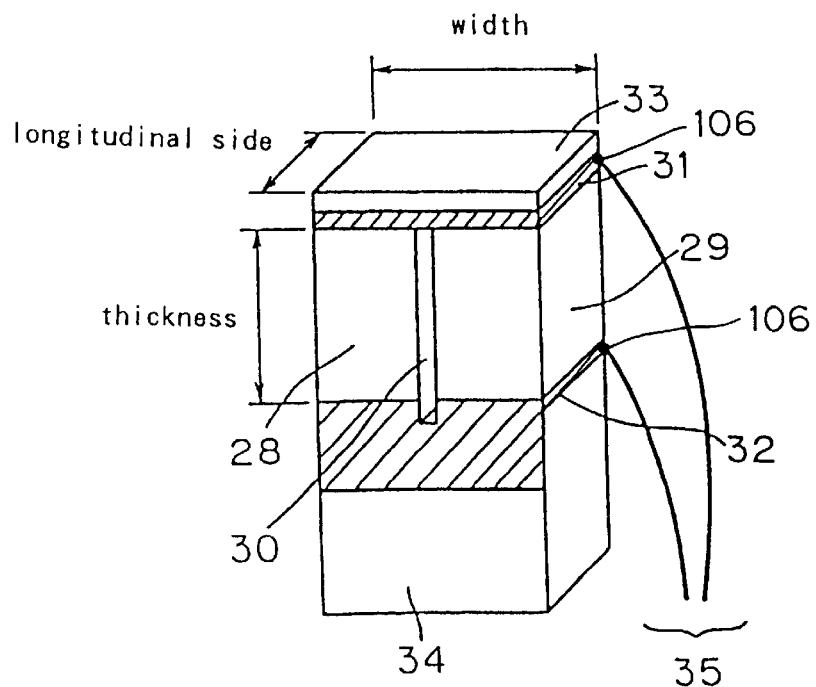
FIG. 6 is a diagram showing a constitution of an ultrasonic transducer in a fourth embodiment of the same.

FIG. 6 is a schematic structural diagram of an ultrasonic transducer used in an ultrasonic flowmeter in the fourth embodiment of the invention. In FIG. 6, reference numeral 33 is a matching layer, 34 is a backing layer, and 35 is a lead wire, and the constitution is so far same as in FIG. 3. What differs from the constitution in FIG. 3 is as follows: two piezoelectric plates, A 28 and B 29, of equal thickness, of which ratio of the longitudinal side to the thickness is 0.6 or less and ratio of the width to the thickness is 0.6 or less are disposed at a gap 30 so as not to contact with each other on the backing layer 34, conductor A 31 and conductor B 32 are electrically connected to the ultrasonic transmitting/receiving surface side and the backing layer side of the piezoelectric plate A 28 and piezoelectric plate B 29, and the gap 30 is not filled with liquid or solid substance.

An example of fabricating method of thus constituted ultrasonic transducer is briefly described below by reference to FIG. 6. To design a compact ultrasonic flowmeter, allowable dimensions for the ultrasonic transducer are smaller. However, considering the characteristics of the ultrasonic transducer, the piezoelectric plate is desired to be as large as possible, and, for example, it may be necessary to select the piezoelectric plate made of piezoelectric ceramic of rectangular parallelepiped of which ratio of the longitudinal side to the thickness is 0.6 or more and ratio of the width to the thickness is 0.6 or less. However, in the piezoelectric plate of such shape, the thickness longitudinal vibration and other vibration mode are mixed, and the characteristic is impaired. In this embodiment, too, the piezoelectric plate is divided into two sections in order to separate the longitudinal vibration and other vibration mode. In embodiment 2 and embodiment 3, the piezoelectric plate is not completely separated in consideration of separation of the longitudinal vibration and other vibration mode and handling of the piezoelectric plate, but the piezoelectric plate is completely separated in this embodiment because the thickness longitudinal vibration and other vibration mode can be separated completely by dividing the piezoelectric plate completely.

For example, in the piezoelectric plate made of piezoelectric ceramic of rectangular parallelepiped of which ratio of the longitudinal side to the thickness is 0.6 or more and ratio of the width to the thickness is 0.6 or less, a conductor B 32 made of copper foil of, for example, 0.02 mm in thickness and larger than the size of the electrode of the piezoelectric plate is adhered together while pressing by using, for example, an epoxy resin adhesive. When the adhesive layer is thin, an electric connection is achieved between the electrodes of the piezoelectric plate and the conductor B 32. The conductor B 32 and a back load material 34 made of, for example, ferrite rubber are adhered with, for example, an epoxy resin adhesive. Part of the conductor B 32 projecting from the piezoelectric plate is folded and adhered to the side of the backing layer 34 with, for example, an epoxy resin adhesive. The piezoelectric plate integrated with the backing layer 34 is completely divided into two sections by using, for example, a dicing machine. However, the formed piezoelectric plate A 28 and piezoelectric plate B 29 are divided so that the ratio of the longitudinal side to the thickness may be 0.6 or less and the ratio of the width to the thickness may be 0.6 or less. The folded portion of the conductor B 32 is not cut off completely. On the piezoelectric plate A 28 and piezoelectric plate B 29, a conductor A 31 of copper foil of 0.02 mm, for example, in thickness is adhered with, for example, an epoxy resin adhesive. To avoid coupling of vibration in the lateral direction, the gap 30 is not filled with liquid or solid substance. A lead wire 35 is adhered, for example, by soldering to the conductor A 31 and conductor B 32. A matching layer 25 made of, for example, polyolefin fine porous film is adhered to the conductor A 31 with, for example, an epoxy resin adhesive, and an ultrasonic transducer is fabricated.

Thus fabricated ultrasonic transducer is high in sensitivity because the longitudinal vibration is the main mode, being less affected by the undesired vibration mode, owing to the isolation of the piezoelectric plate A 28 and piezoelectric plate B 29 through the gap 30. Moreover, since the matching layer 33 and backing layer 34 are disposed, ultrasonic pulses of short ringing and quick rise can be transmitted.

The manufacturing method of the flow rate receiving unit of the ultrasonic flowmeter, and the operating method of the ultrasonic flowmeter for measuring the flow rate of the air 1 flowing in the flow passage 2 of a rectangular cross section by using the ultrasonic transducer A 7 and ultrasonic transducer B 8 are same as in embodiment 1, and are hence omitted herein.

Thus, according to this embodiment, the piezoelectric plate of which ratio of the longitudinal side to the thickness is 0.6 or more and ratio of the width to the thickness is 0.6 or less is divided into two piezoelectric plates, A 28 and B 29, of which ratio of the longitudinal side to the thickness is 0.6 or less and ratio of the width to the thickness is 0.6 or less, and therefore the ultrasonic transducer of high sensitivity, fast response, wide selection range of frequency and dimensions and small size is obtained, and the flow rate of the air 1 flowing in the flow passage 2 may be measured at high accuracy in short time.

In the fourth embodiment, the piezoelectric plate of which ratio of the longitudinal side to the thickness is 0.6 or more and ratio of the width to the thickness is 0.6 or less is used, but the piezoelectric plate of which ratio of the longitudinal side to the thickness is 0.6 or less and ratio of the width to the thickness is 0.6 or more, or ratio of the longitudinal side to the thickness is 0.6 or more and ratio of the width to the thickness is 0.6 or more may be used. Or, instead of dividing into the piezoelectric plate A 28 and piezoelectric plate B 29, it may be divided into three or more sections. Or instead of dividing the one piezoelectric plate after adhering to the backing layer 34, two or more piezoelectric plates of same thickness may be adhered to the backing layer 34. Instead of adhering the copper foil to the piezoelectric plate A 28 and piezoelectric plate B 29 with adhesive, the electric connection may be achieved by soldering the lead wire or using conductors A 31 and B 32 such as conductive paste. The gap 30 is not filled with liquid or solid substance, but in order to increase the mechanical strength of the piezoelectric plate, the gap 30 may be filled with, for example, silicone rubber which is relatively hard to transmit the vibration. Instead of using the ultrasonic transducer in the flow rate receiver unit of the ultrasonic flowmeter, it may be also used as the ultrasonic transducer for air or water used in an open space.

The height of the flow passage 2 is at least preferred to be equal to the length of the side corresponding to the height of the flow passage 2 of the ultrasonic transmitting/receiving surface, but they may not be always equal. The backing layer 34 is used herein, but the backing layer 34 is not always necessary if the ultrasonic transducer of higher sensitivity is needed in the condition of driving at low voltage. The electrodes are not required on all surfaces of the ultrasonic transmitting/receiving surface and the confronting surface of the piezoelectric plate A 28 or piezoelectric plate B 29. The gap 30, as far as it is possible to separate into the longitudinal vibration and undesired vibration mode, is not always required to be disposed in the direction vertical to the plane of the electrodes of the piezoelectric plate A 28 or piezoelectric plate B 29. The piezoelectric plate A 28 and piezoelectric plate B 29 may be, for example, plural piezoelectric plates of cylindrical columnar shape as far as the piezoelectric plates are for thickness longitudinal vibration. The matching layer 33 is made of polyolefin porous film, but any other acoustic matching material suited to the fluid to be measured may be used. Instead of ferrite rubber, the backing layer 34 may be made of any other material as far as the undesired vibration can be attenuated.

(5) Embodiment 5

A fifth embodiment of the invention is described below by reference to the drawing.

Figure 7:
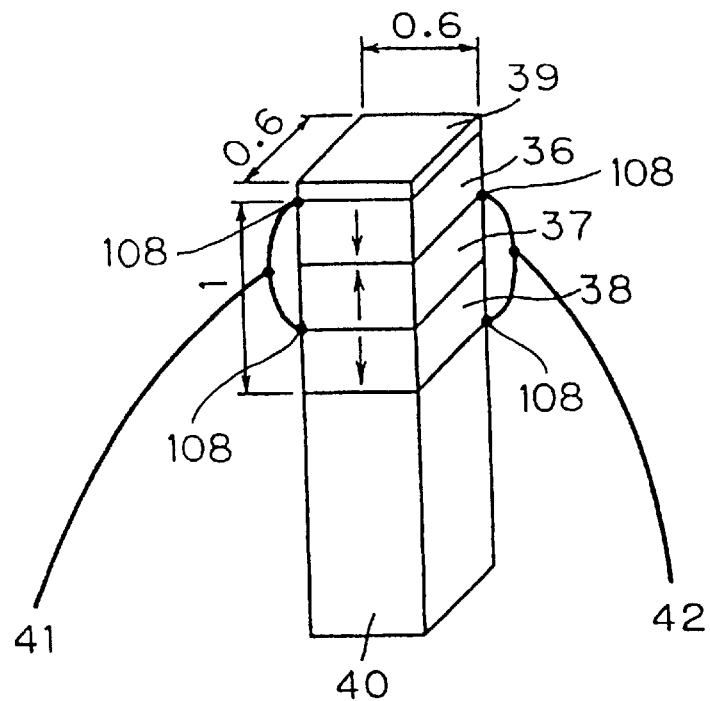
FIG. 7 is a diagram showing a constitution of an ultrasonic transducer in a fifth embodiment of the same.

FIG. 7 is a schematic structural diagram of an ultrasonic transducer used in an ultrasonic flowmeter in the fifth embodiment of the invention. In FIG. 7, reference numeral 39 is a matching layer and 40 is a backing layer, and the constitution is so far same as in FIG. 3. What differs from the constitution in FIG. 3 is as follows: the piezoelectric plate is composed by laminating three piezoelectric plates of equal thickness, the ratio of the longitudinal side to the thickness of the entire laminated piezoelectric plate is 0.6 or less and ratio of the width to the thickness is 0.6 or less, the three piezoelectric plates are disposed so as to be mutually opposite in the direction of polarization, and lead wire A 41 and lead wire B 42 are provided so that the electrodes of the three piezoelectric plates may be of the same potential in every other plate.

An example of fabricating method of thus constituted ultrasonic transducer is briefly described below by reference to FIG. 7. To design a compact and inexpensive ultrasonic flowmeter, allowable dimensions for the ultrasonic transducer are small, and considering the price of the circuit, the frequency to be used is preferred to be a lower frequency. Accordingly, in the piezoelectric plate using longitudinal vibration, the impedance is high, and it is hard to achieve matching with the circuit, effects of noise cannot be ignored, and the performance of the ultrasonic transducer may not be exhibited sufficiently.

In particular, in the condition of driving at low voltage, since the absolute value of the ultrasonic pulse being received is small, the S/N is poor, which may give large effects on the accuracy of measurement of flow rate. Hence, it is necessary to decrease the electric impedance of the piezoelectric plate and reduce the effects of noise, etc.

Accordingly, it may be considered to laminate three piezoelectric plates in the thickness direction. Supposing the thickness of the piezoelectric plate satisfying the condition in which the ratio of the longitudinal side to the thickness is 0.6 or less and the ratio of the width to the thickness is 0.6 or less to be T, the thickness of the piezoelectric plate A 36, piezoelectric plate B 37, and piezoelectric plate C 38 to be laminated is T/3.

The piezoelectric plate A 36, piezoelectric plate B 37, and piezoelectric plate C 38 made of, for example, piezoelectric ceramic having such dimensions are adhered while pressing by using, for example, an epoxy resin adhesive so that the direction of polarization may be mutually opposite. When the adhesive layer is thin, the electrode between piezoelectric plate A 36 and piezoelectric plate B 37, and the electrode between piezoelectric plate B 37 and piezoelectric plate C 38 are mutually connected electrically. The electrode above the piezoelectric plate A 36, and the electrode between piezoelectric plate B 37 and piezoelectric plate C 38 are electrically connected by adhering a lead wire A 41 by using, for example, silver paste to the portion visible from the side of the piezoelectric plate. Similarly, the electrode between piezoelectric plate A 36 and piezoelectric plate B 37 and the electrode beneath the piezoelectric plate C 38 are electrically connected by adhering a lead wire B 42 by using, for example, silver paste to the portion visible from the side of the piezoelectric plate. By the lead wire A 41 and lead wire B 42, the piezoelectric plate A 36, piezoelectric plate B 37, and piezoelectric plate C 38 are connected.

Thus, the vibration in the thickness direction of the piezoelectric plate composed by laminating three piezoelectric plates may be longitudinal vibration even at the frequency derived from thickness T. As for the impedance, owing to effects of the adhesive layer at the boundary surface of the piezoelectric plates, it is not same as the impedance of the piezoelectric plate of which thickness is T/3 and the electrode area is three times, but is smaller than the electric impedance of the piezoelectric plate of which thickness is T. In this way, the same effects are obtained as when one piezoelectric plate of which thickness is T/3 and electrode area is three times is folded, and the electric impedance can be decreased as compared with one piezoelectric plate of rectangular parallelepiped.

The piezoelectric plate formed by adhering the piezoelectric plate A 36, piezoelectric plate B 37, and piezoelectric plate C 38 is in a shape of which ratio of the longitudinal side to the thickness is 0.6 or less and ratio of the width to the thickness is 0.6 or less, so that only the thickness longitudinal vibration can be utilized selectively. Beneath the piezoelectric plate C 38, a backing layer 34 of, for example, ferrite rubber is adhered with, for example, an epoxy resin adhesive. Above the piezoelectric plate A 36, a matching layer 39 of, for example, polyolefin fine porous film is adhered with, for example, an epoxy resin adhesive, and an ultrasonic transducer is fabricated.

The manufacturing method of the flow rate detecting unit of the ultrasonic flowmeter, and the operating method of the ultrasonic flowmeter for measuring the flow rate of the air 1 flowing in the flow passage 2 of a rectangular cross section by using the ultrasonic transducer A 7 and ultrasonic transducer B 8 are same as in embodiment 1, and are hence omitted herein.

Thus, according to this embodiment, by using the piezoelectric plate of which ratio of the longitudinal side to the thickness is 0.6 or less and ratio of the width to the thickness is 0.6 or less in the total thickness of the piezoelectric plate by laminating the piezoelectric plate A 36, piezoelectric plate B 37, and piezoelectric plate C 38 equal in thickness so as to be mutually opposite in the direction of polarization, the electric impedance can be decreased, and therefore the ultrasonic transducer of high resistance to noise, high sensitivity, fast response, wide selection range of frequency and dimensions and small size is obtained, and the flow rate of the air 1 flowing in the flow passage 2 may be measured at high accuracy in short time.

In the fifth embodiment, instead of three piezoelectric plates to be laminated, the number may be five or more odd number, or two or more even number. Herein, the ratio of the longitudinal side to the thickness of the laminated piezoelectric plates is 0.6 or less and ratio of the width to the thickness is 0.6 or less, but the ratio of the longitudinal side to the thickness may be 0.6 or more or the ratio of the width to the thickness may be 0.6 or more. However, in the case of such shape, it is necessary to divide, same as in embodiment 3, embodiment 4, and embodiment 5. Instead of using the ultrasonic transducer in the flow rate detecting unit of the ultrasonic flowmeter, it may be also used as the ultrasonic transducer for air or water used in an open space.

The height of the flow passage 2 is at least preferred to be equal to the length of the side corresponding to the height of the flow passage 2 of the ultrasonic transmitting/receiving surface, but they may not be always equal. The backing layer 40 is used herein, but the backing layer 40 is not always necessary if the ultrasonic transducer of higher sensitivity is needed in the condition of driving at low voltage. The electrodes are not required on all surfaces equal in the direction to the ultrasonic transmitting/receiving surface and the confronting surface of the piezoelectric plate A 36, piezoelectric plate B 37, and piezoelectric plate C 38. The piezoelectric plate A 36, piezoelectric plate B 37, and piezoelectric plate C 38 are not limited to the rectangular parallelepiped, but plural circular columnar piezoelectric plates may be used. The matching layer 39 is made of polyolefin porous film, but any other acoustic matching material suited to the fluid to be measured may be used. Instead of ferrite rubber, the backing layer 40 may be made of any other material as far as the undesired vibration can be attenuated.

(6) Embodiment 6

A sixth embodiment of the invention is described below by reference to the drawings.

This embodiment discloses specific investigations made into the ultrasonic transducer used in embodiment 1 to embodiment 4.

Figure 8:
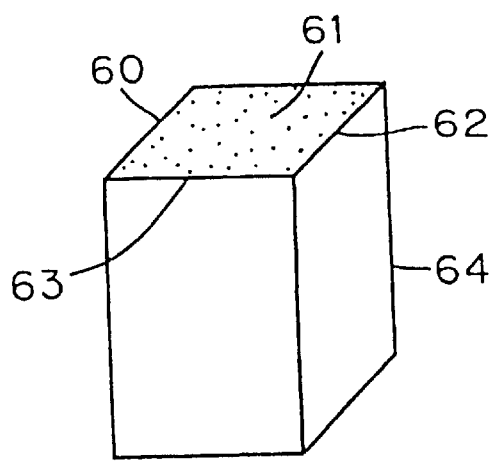
FIG. 8 is a diagram showing a constitution of the piezoelectric material used in the analysis of the same.
Figure 9:
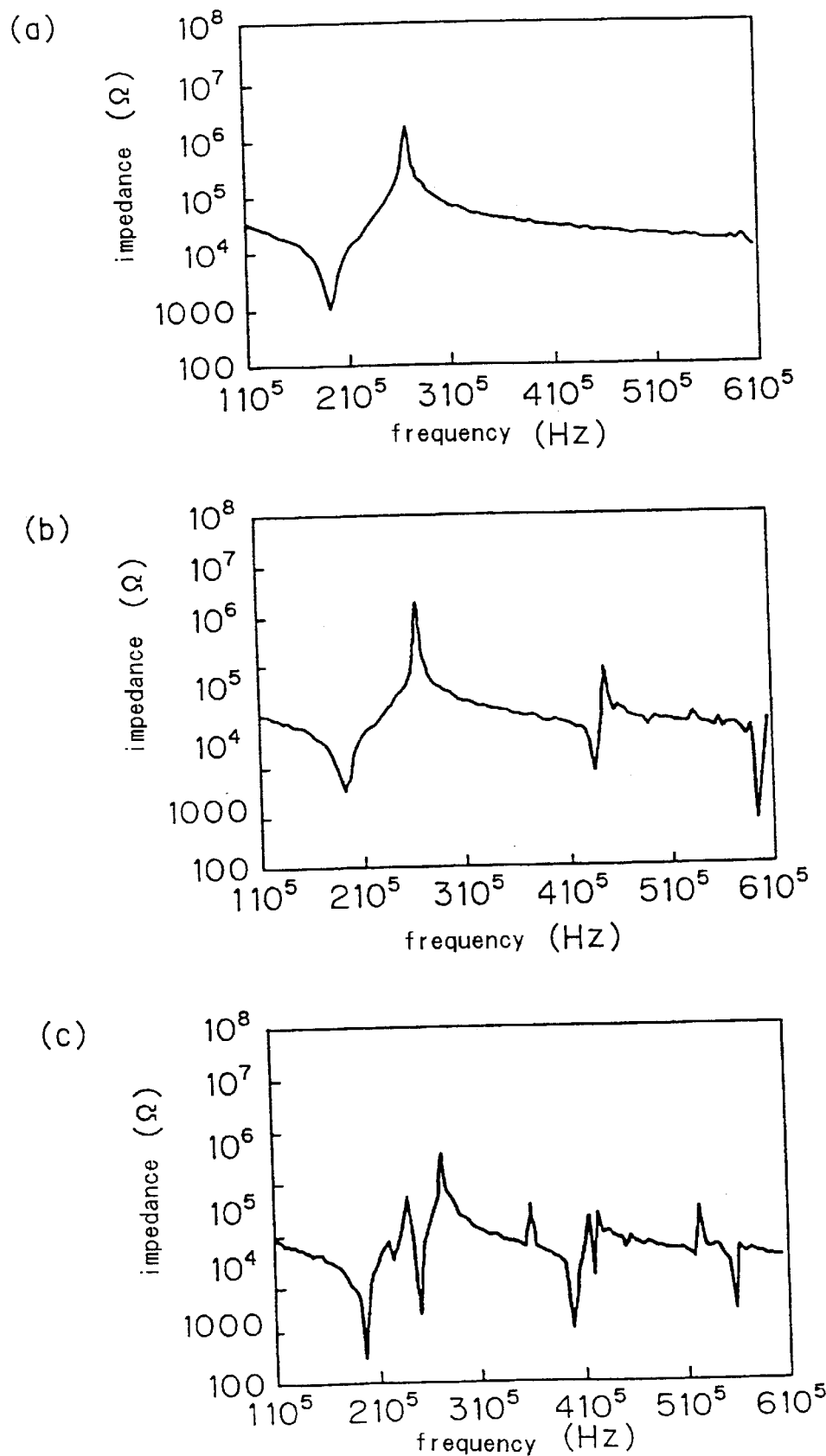
FIG. 9 is a diagram showing the impedance analysis result by finite element method in a sixth embodiment of the same.

First, the relation of the lengths of the sides of the transmitting/receiving surface of the piezoelectric plate to the thickness is described by reference to FIG. 8 and FIG. 9. FIG. 8 shows a shape of the piezoelectric plate as one of components of the ultrasonic transducer used in the ultrasonic flowmeter in an embodiment of the invention. In FIG. 8, reference numeral 60 is a piezoelectric plate of rectangular parallelepiped, 61 is a transmitting/receiving surface of the piezoelectric plate 60, 62 is a longitudinal side of the piezoelectric plate 60, 63 is a lateral side of the piezoelectric plate 60, and 64 is a thickness of the piezoelectric plate 60. FIG. 9 shows the impedance analysis result by the finite element method, in the shape in FIG. 8, using piezoelectric ceramic as the piezoelectric plate 60, at a constant thickness 64 (8 mm), and by varying the length of the longitudinal side 62 and the width 63 of the transmitting/receiving surface 61. In both diagrams, the axis of abscissas denotes the frequency, the axis of ordinates represents the impedance, the length of the longitudinal side 62 is L, the length of the width 63 is W, and the thickness 64 is T. FIG. 9(a) corresponds to L/T=W/T=0.4, FIG. 9 (b) to L/T=W/T=0.6, and FIG. 9(c) to L/T=0.6, W/T=0.8.

In FIG. 9(a), the resonance frequency of the longitudinal vibration at thickness 64 coincides with the portion of the valley appearing around 180 kHz, and the anti-resonance frequency is the portion of the mountain appearing around 260 kHz. In the illustrated range, neither resonance frequency (mountain) nor anti-resonance frequency (valley) of other vibration mode is observed. In FIG. 9(b), same as in FIG. 9(a), the resonance frequency and anti-resonance frequency of the longitudinal vibration are clearly recognized. Besides, at a frequency being apart to such an extent that there is no effect on the longitudinal vibration (around 430 kHz), the resonance frequency and anti-resonance frequency of other vibration mode are also observed. In FIG. 9(c), between the resonance frequency (around 180 kHz) and anti-resonance frequency (around 260 kHz) of the longitudinal vibration, resonance frequency and anti-resonance frequency of other vibration mode are noted, and the coexistence of the longitudinal vibration and other vibration mode is known. According to this result of analysis, it is found that the longitudinal vibration can be used most efficiently as the main mode when the ratio of the lengths of the longitudinal side 62 and width 63 of the transmitting/receiving surface 61 of the piezoelectric plate 60 to the thickness 64 is all 0.6 or less.

Figure 10:
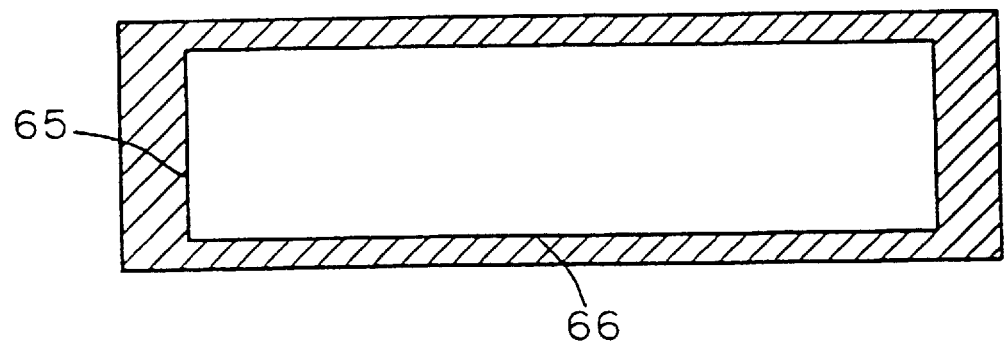
FIG. 10 is a diagram showing a flow passage cross section in the sixth embodiment of the same.

Discussed below is the piezoelectric plate in the dimensions suited to the flow passage section shown in FIG. 10. For example, the flow passage height 65 is 8 mm, and flow passage width 66 is 40 mm. From the measuring accuracy of the ultrasonic flowmeter and the industrial viewpoint, the lengths of the longitudinal side 62 and width 63 of the piezoelectric plate 60 are supposed to be 8 mm equal to the flow passage height 65, and the thickness 64 is 5 mm. Conforming to the condition that the ratio of the lengths of the longitudinal side 62 and width 63 of the transmitting/receiving surface 61 to the thickness 64 is all 0.6 or less, for example, the transmitting/receiving surface 61 must be divided at least into nine sections. However, when the number of grooves formed for dividing is increased, the processing time is longer and the manufacturing cost may be increased. Accordingly, while decreasing the number of grooves, the shape capable of separating the longitudinal vibration and other undesired vibration mode to degrees free from practical problem was studied.

Figure 11:
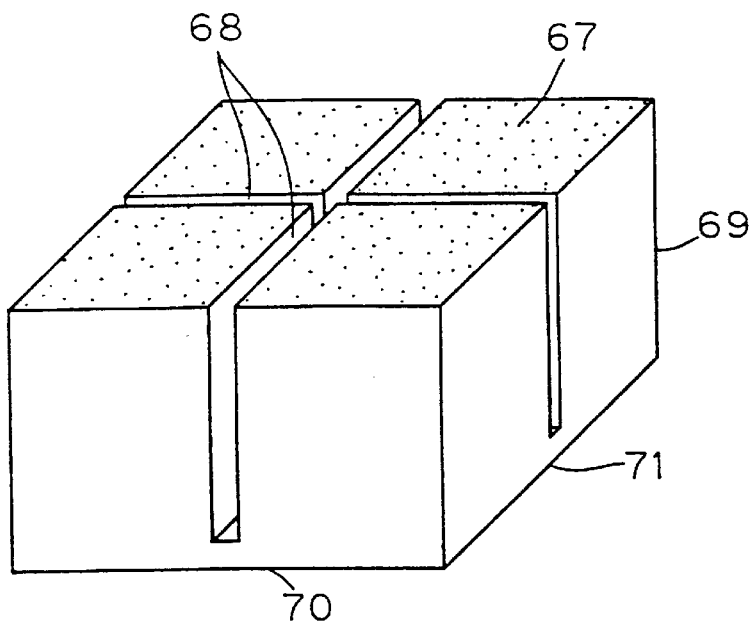
FIG. 11 is a diagram showing the piezoelectric material composing two grooves in the sixth embodiment of the same.
Figure 12:
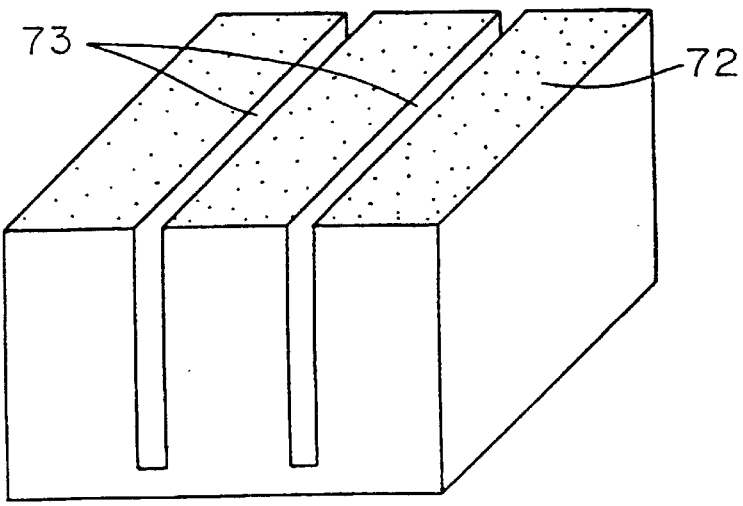
FIG. 12 is a diagram showing the piezoelectric material composing three grooves in the sixth embodiment of the same.

Two grooves 68 are provided in a piezoelectric plate 67 in FIG. 11, and two grooves 73 are provided in a piezoelectric plate 72 in FIG. 12, and the impedance was analyzed again by using the finite element method. The impedance was analyzed in the shape as shown in FIG. 8, in which the piezoelectric plate was completely divided. FIG. 13(a) corresponds to the case of FIG. 11, in which the longitudinal side 62 and width 63 are both 4 mm (L/T=W/T=0.8), and FIG. 13(b) corresponds to the case of FIG. 12, in which the longitudinal side 62 is 2.7 mm and width 63 is 8 mm (L/T=0.5, W/T=1.6). By way of comparison, FIG. 13(c) shows the result of analysis in which the longitudinal side 62 and width 63 are both 3 mm (L/T=W/T=0.6).

In FIG. 13(a), as compared with FIG. 13(c), other undesired vibration mode is present at a frequency closer to the longitudinal vibration, but its effect is estimated to be small. In FIG. 13(b), it is known that the longitudinal vibration and other undesired vibration mode coexist. Considering from these results, it is judged to be free from practical problem in the condition of the longitudinal side 62 and width 63 both being 4 mm, and the groove 68 is provided in the piezoelectric plate 67 as shown in FIG. 11.

Figure 13:
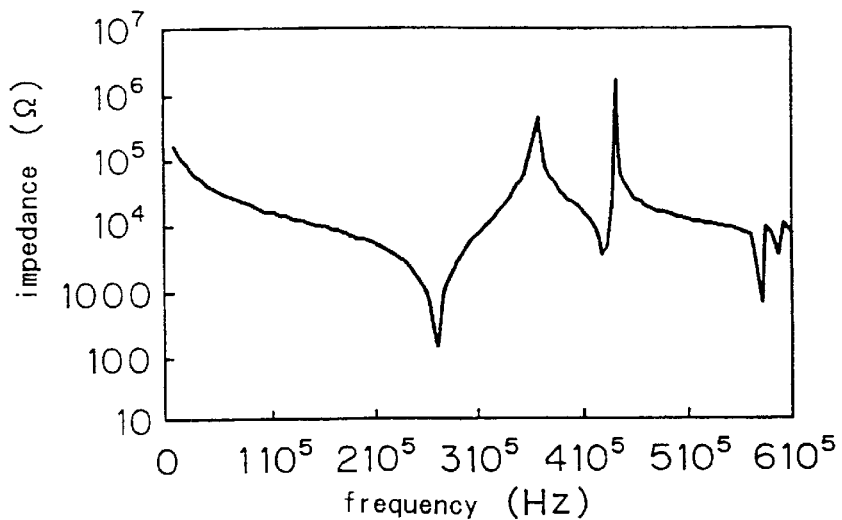
FIG. 13 is a diagram showing the impedance analysis result by finite element method in the sixth embodiment of the same.
Figure 13:
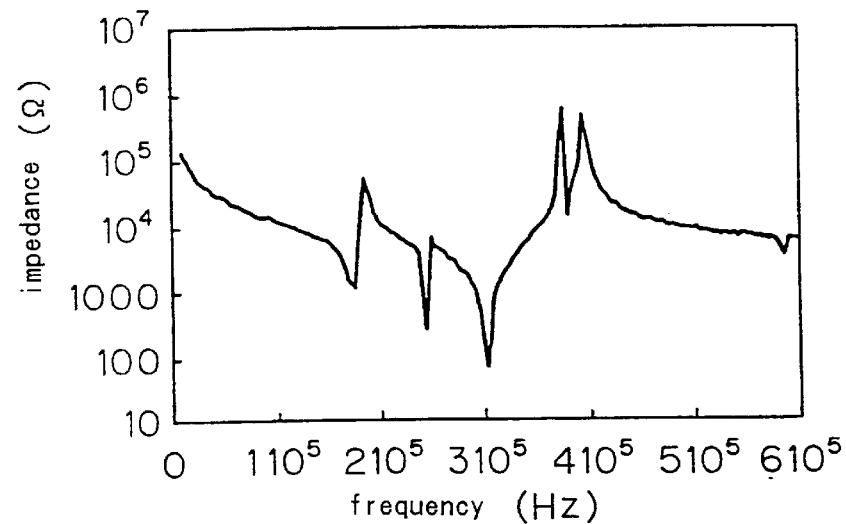
Figure 13:
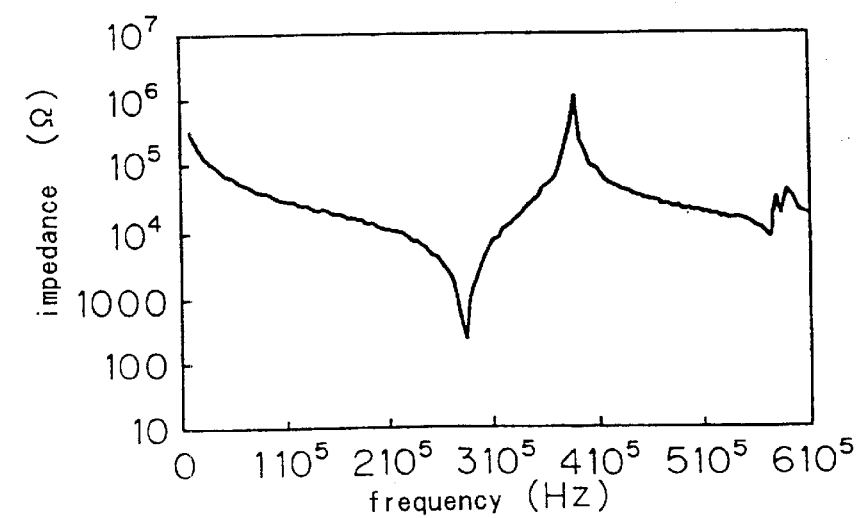

Finally, the effect of depth of the groove was evaluated by actually forming a groove in the piezoelectric plate by using a dicing machine. The lengths of longitudinal side 71 and lateral side 70 of the piezoelectric plate 67 are 8 mm, and the thickness 69 is 5 mm. Two grooves 68 are provided so as to intersect near the center of the transmitting/receiving surface as shown in FIG. 13. The depth of the two grooves 68 was equal.

Figure 14:
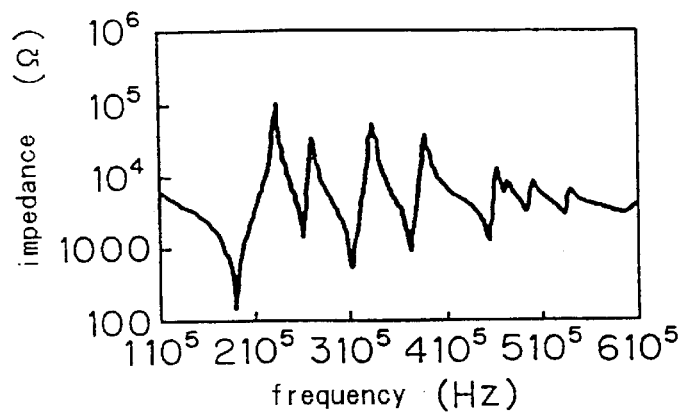
FIG. 14 is a diagram showing the impedance measurement result of the piezoelectric material having the groove in the sixth embodiment of the same.
Figure 14:
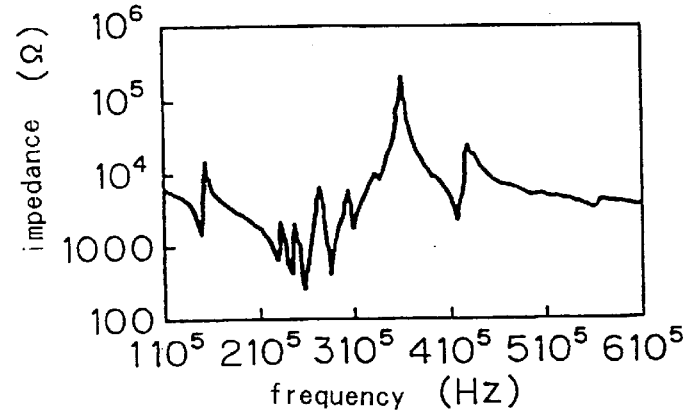
Figure 14:
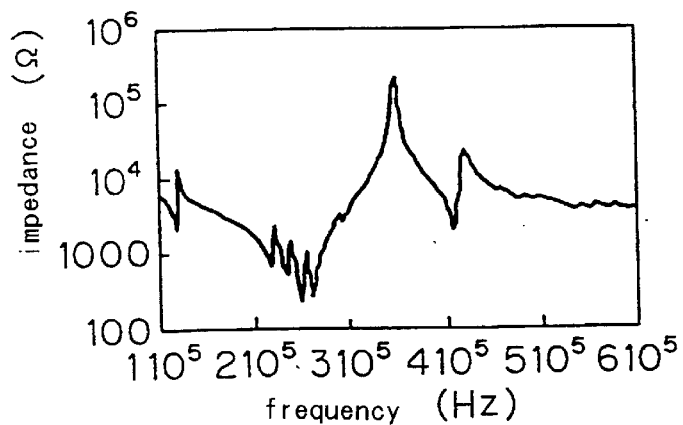
Figure 14:
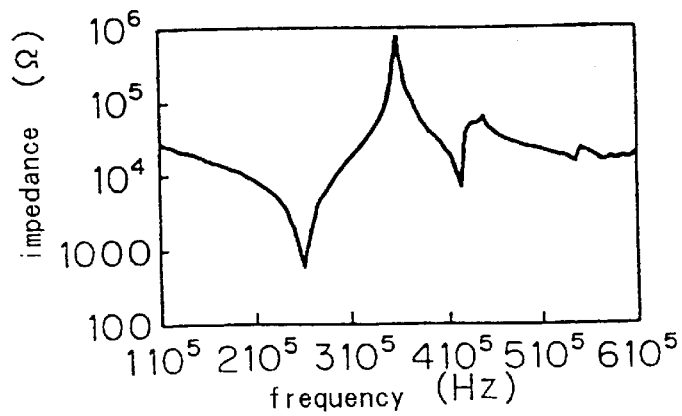

FIG. 14(a) shows the depth of the groove 68 to be 0% of the thickness 69, FIG. 14(b) shows the depth of the groove 68 to be 80% of the thickness 69, FIG. 14(c) shows the depth of the groove 68 to be 90% of the thickness 69, and FIG. 14(d) shows a completely cut-off state. By the impedance tracking alone, a definite conclusion is not obtained about separation of the longitudinal vibration and other undesired vibration mode, but as far as the depth of the groove 68 is 90% or more of the thickness 69, it is estimated that the longitudinal vibration and undesired vibration mode can be separated to degrees free from practical problem.

The characteristics were evaluated by trial production of the ultrasonic transducer by using the piezoelectric plate 67 in the shape as shown in FIG. 11 having a cross groove 68, being 8 mm in the lengths of the longitudinal side 71 and lateral side 70 of the piezoelectric plate 67 and 5 mm in thickness 69.

Figure 15:
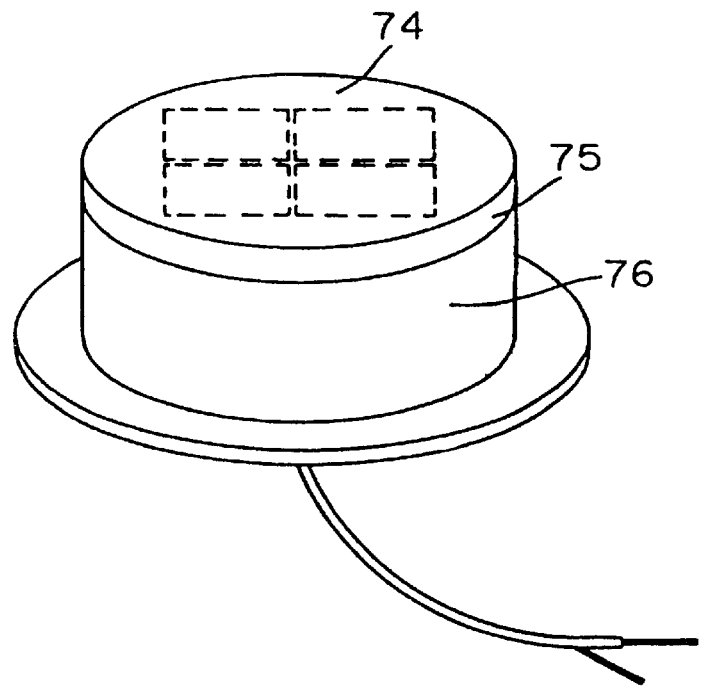
FIG. 15 is a diagram showing the appearance constitution of the ultrasonic transducer in the sixth embodiment of the same.
Figure 16:
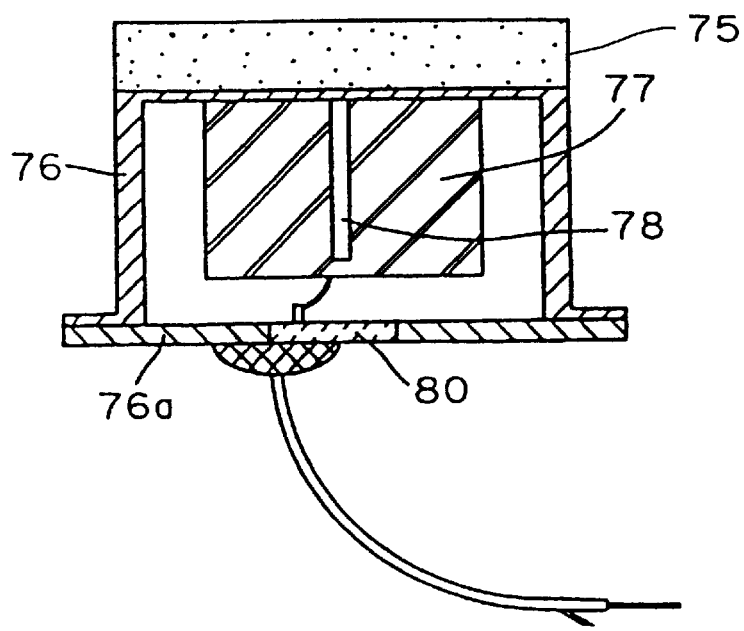
FIG. 16 is a diagram showing the sectional constitution of the ultrasonic transducer in the sixth embodiment of the same.
Figure 17:
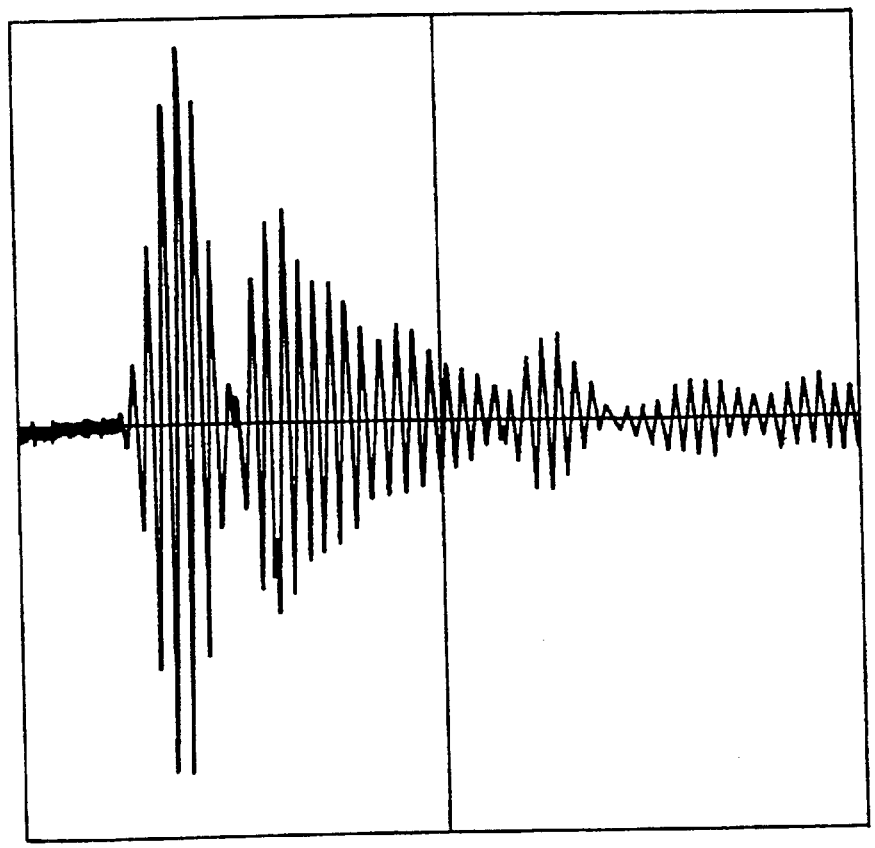
FIG. 17 is a diagram showing the ultrasonic pulses of the ultrasonic transducer in the sixth embodiment of the same.

The appearance of the ultrasonic transducer is shown in FIG. 15, its sectional view in FIG. 16, and ultrasonic pulses in FIG. 17. In FIG. 15, reference numeral 74 is an ultrasonic transducer, 75 is a matching layer of disk shape made of epoxy resin and glass balloon, and 76 is a cylindrical case made of brass. In FIG. 16, reference numeral 77 is a piezoelectric plate made of piezoelectric ceramic having a cross groove 78. Herein, assuming to be driven at about a battery voltage, backing layer for obtaining ultrasonic transducer 74 of high sensitivity is not provided. In FIG. 17, in the flow passage having a cross section of 8 mm in flow passage height 65 and 40 mm in flow passage width 66, a pair of sets of ultrasonic transducer 74 are disposed oppositely, ultrasonic pulses are obtained by driving one ultrasonic transducer 74 by square waves of three periods and receiving in other ultrasonic transducer. By these ultrasonic pulses, it is confirmed that the ultrasonic transducer 74 has characteristics practically free from problems.

Thus, according to the embodiment, as far as the depth of the groove is 90% or more and less than 100% of the thickness in the direction vertical to the transmitting/receiving surface, the longitudinal vibration and other undesired vibration mode can be separated to an extent free from practical problems. Besides, when the ratio of the lengths of the sides of each ultrasonic transmitting/receiving surface divided by the groove to the thickness is all 0.8 or less, or preferably 0.6 or less, the thickness longitudinal vibration and other undesired vibration mode can be separated to an extent free from practical problems, and the longitudinal vibration can be used as the main mode.

The matching layer 75 is in a form of disk, but it may be also square or ellipsis. The case 76 is cylindrical, but it may be formed in other shape as far as the piezoelectric plate 77 can be disposed inside. As the material for the matching layer 75 and case 76, of course, an optimum material may be selected depending on the environments of use, cost, etc.

In the embodiment, the case 76 is formed in a cylindrical form having a top, and the bottom opening is covered with a brass lid 76a same as the case 76, and these plates are joined to seal the piezoelectric plate 77. Therefore, if the piezoelectric plate 77 accumulates an electric charge and spark, it can be shut off by the shielding effect by the case 76 and lid 76a, and if the fluid to be measured is flammable gas or flammable liquid, the safety can be maintained. Incidentally, the air in a space 79 enclosed by the case 76 and lid 76a is dry so as to prevent dew condensation in the space 79 to lead to dissolving and breakdown of the ceramic of the piezoelectric plate 77, and the reliability is enhanced. Moreover, the ceiling of the case 76 also serves as the electrode, and part of the lead wire is connected to the lid 76*a*, and therefore the constitution for taking out the lead wire can be simplified. In the diagram, reference numeral 80 is an insulator integrated with the lid 76*a*, from which other lead wire is drawn out.

Figure 18:
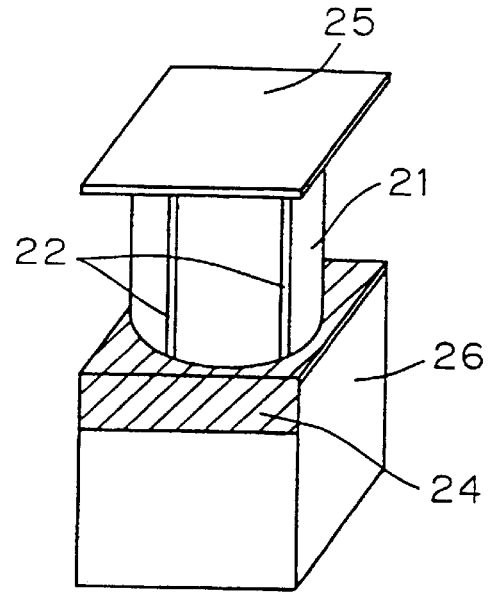
FIG. 18 is a diagram showing the appearance constitution of a modified example of the ultrasonic transducer in the third embodiment of the same.
Figure 19:
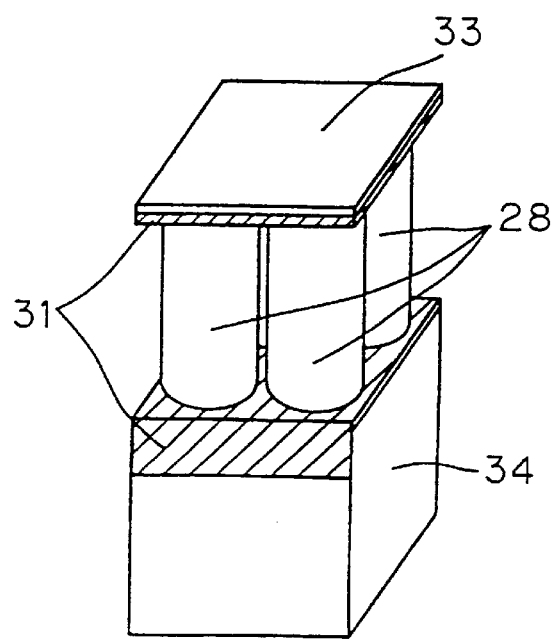
FIG. 19 is a diagram showing the appearance constitution of a modified example of the ultrasonic transducer in the fourth embodiment of the same.
Figure 20:
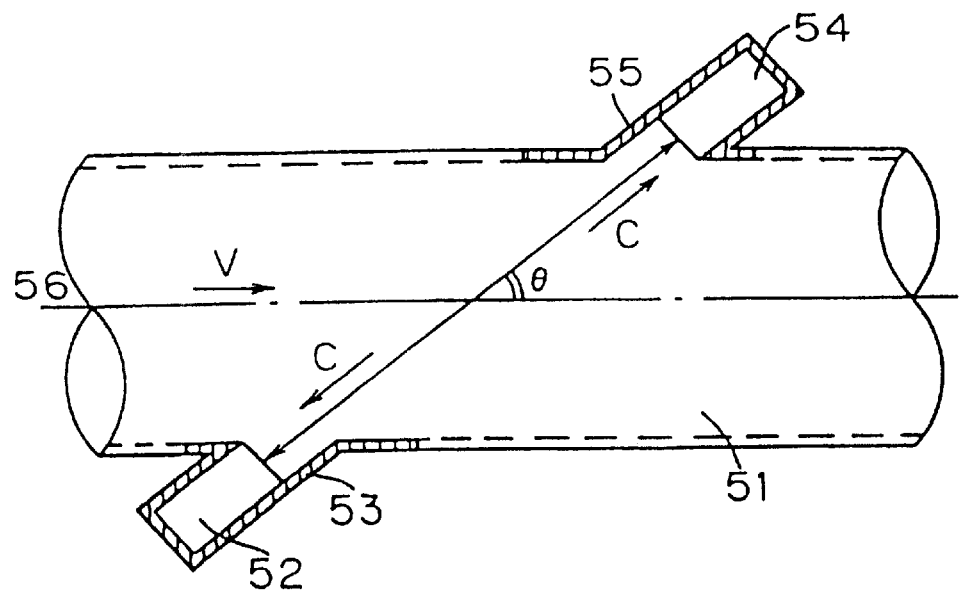
FIG. 20 is a diagram showing the constitution of a conventional ultrasonic flowmeter.
Figure 21:
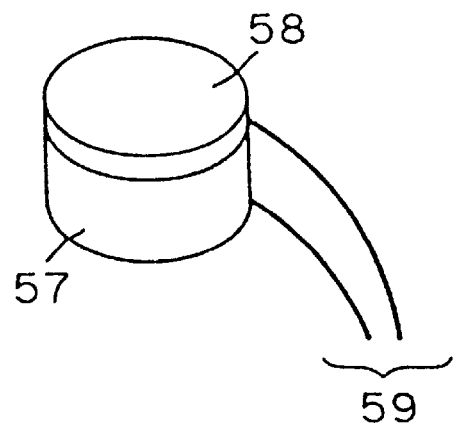
FIG. 21 is a diagram showing the constitution of a conventional ultrasonic vibrator for gas.

FIG. 18 shows a modified example of embodiment 3, and FIG. 19 shows a modified example of embodiment 4, and the piezoelectric plate is cylindrical in both examples.

INDUSTRIAL APPLICABILITY

Thus, the first ultrasonic flowmeter of the invention includes a flow passage, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and at least one of the transmitting/receiving surface and the surface confronting the transmitting/receiving surface of the piezoelectric material is divided into plural sections, all of electrodes disposed on the divided section are electrically connected with conductors, and the piezoelectric material, by dividing at least one of the transmitting/receiving surface and the surface confronting the transmitting/receiving surface into plural sections, is capable of separating the thickness longitudinal vibration and undesired vibration mode, and therefore the ultrasonic transducer of high sensitivity, fast response, wide selection range of frequency and dimensions and small size is obtained, so that the ultrasonic flowmeter of high accuracy and compact size is realized.

The second ultrasonic flowmeter of the invention includes a parallel flow passage having a gap of a specified height at a specified position and having a specified width, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are electrically connected through conductors, and the piezoelectric material, by dividing at least one of the transmitting/receiving surface and the surface confronting this transmitting/receiving surface into plural sections, is capable of separating the thickness longitudinal vibration and undesired vibration mode, and therefore the ultrasonic transducer of high sensitivity, fast response, wide selection range of frequency and dimensions and small size is obtained, and moreover by forming the cross section of the flow passage into a rectangular form, the flow velocity distribution in the section of the flow passage can be simplified, and the flow rate can be deduced at high accuracy from the obtained flow velocity, so that the ultrasonic flowmeter of high accuracy is realized.

The third ultrasonic flowmeter of the invention includes a flow passage, and an ultrasonic transducer disposed for measuring the flow rate of the fluid in this flow passage, in which the ultrasonic transducer comprises plural piezoelectric materials having electrodes on the opposed surfaces thereof, one of which is used as a transmitting/receiving surface, with this transmitting/receiving surface facing the flow passage, and at least one of the transmitting/receiving surface and the surface confronting this transmitting/receiving surface of the piezoelectric material is divided into plural sections, and all of electrodes disposed on the divided section are electrically connected through conductors, and the conductors are sufficiently thin as compared with the wavelength of the ultrasonic wave generated from the ultrasonic transducer, and hence the piezoelectric material, by dividing at least one of the transmitting/receiving surface and the surface confronting this transmitting/receiving surface into plural sections, is capable of separating the thickness longitudinal vibration and undesired vibration mode, while the electrodes can be connected without having effects on the characteristic of the ultrasonic transducer and handling of the piezoelectric material is easy, and therefore the ultrasonic transducer of high sensitivity, fast response, wide selection range of frequency and dimensions and small size is obtained, so that the ultrasonic flowmeter of high accuracy is realized.

The fourth ultrasonic flowmeter of the invention includes a parallel flow passage having a gap of a specified height at a specified position and having a specified width, and an ultrasonic transducer disposed for measuring the flow rate of the fluid in this flow passage, in which the ultrasonic transducer comprises a piezoelectric material having electrodes on the opposed surfaces thereof, one of which is used as a transmitting/receiving surface, with this transmitting/receiving surface facing the flow passage, and the piezoelectric material divides at least one of the transmitting/receiving surface and the surface confronting this transmitting/receiving surface into plural sections, and all of electrodes disposed on the divided section are individually connected with conductors, and the conductors are sufficiently thin as compared with the wavelength of the ultrasonic wave generated from the ultrasonic transducer, and hence the piezoelectric material, by dividing at least one of the transmitting/receiving surface and the surface confronting this transmitting/receiving surface into plural sections, is capable of separating the thickness longitudinal vibration and undesired vibration mode, while the electrodes can be connected without having effects on the characteristic of the ultrasonic transducer and handling of the piezoelectric material is easy, and therefore the ultrasonic transducer of high sensitivity, fast response, wide selection range of frequency and dimensions and small size is obtained, and moreover by forming the cross section of the flow passage into a rectangular form, the flow velocity distribution in the section of the flow passage can be simplified, and the flow rate can be deduced at high accuracy from the obtained flow velocity, so that the ultrasonic flowmeter of high accuracy is realized.

In the invention, when the conductors are composed in a cylindrical case with a top incorporating the piezoelectric material and having the ceiling electrically connected with all of electrodes disposed on the divided section of the piezoelectric material, in an electric charge is accumulated in the piezoelectric material to ignite a spark, since the piezoelectric material is incorporated in the cylindrical case with a top having the ceiling, the safety can be assured if the fluid to be measured is flammable gas or flammable liquid, and an accurate and compact ultrasonic flowmeter of high safety is obtained.

The fifth ultrasonic flowmeter of the invention relates to the ultrasonic flowmeter of the first to fourth aspects, in which at least one of the transmitting/receiving surface of the piezoelectric material and the surface confronting this transmitting/receiving surface is divided into plural sections by forming a groove, and the thickness longitudinal vibration and undesired vibration mode can be separated by this groove, and therefore the ultrasonic transducer of high sensitivity, fast response, wide selection range of frequency and dimensions and small size is obtained, so that the ultrasonic flowmeter of high accuracy and compact size is realized.

In the invention, the groove divides the piezoelectric material in such a depth that the vibration in the electrode direction vertical to the transmitting/receiving surface may be the main mode, and the depth of the groove is 90% or more and less than 100% of the thickness in the direction vertical to the transmitting/receiving surface, and therefore the piezoelectric material is not separated completely, and it is easy to handle the piezoelectric material, and moreover the longitudinal vibration and the undesired vibration mode can be separated to degrees free from practical problem, and therefore the ultrasonic transducer of high sensitivity, fast response, wide selection range of frequency and dimensions and small size is obtained, so that the ultrasonic flowmeter of high accuracy and compact size is realized.

Also in the invention, the lengths of the longitudinal and lateral sides divided by the groove are set so that the vibration in the direction vertical to the transmitting/receiving surface may be the main mode, and the ratio of the lengths of the longitudinal and lateral sides divided by the groove to the thickness is all 0.8 or less, and therefore the longitudinal vibration and the undesired vibration mode can be separated to degrees free from practical problem and the longitudinal vibration can be used as the main mode, and therefore the ultrasonic transducer of high sensitivity, fast response, wide selection range of frequency and dimensions and small size is obtained, so that the ultrasonic flowmeter of high accuracy and compact size is realized.

Further in the invention, plural grooves are provided in the piezoelectric material, and therefore the ultrasonic transducer of small size, being much wider in the selection range of frequency and dimensions, is obtained, so that the ultrasonic flowmeter of high accuracy and compact size is realized.

The sixth flowmeter of the invention includes a flow passage, and an ultrasonic transducer disposed for measuring the flow rate of the fluid in this flow passage, in which the ultrasonic transducer comprises plural piezoelectric materials having electrodes on the opposed surfaces thereof, one of which is used as a transmitting/receiving surface, with this transmitting/receiving surface facing the flow passage, and each piezoelectric material is disposed so that at least one of the transmitting/receiving surface and the surface confronting this transmitting/receiving surface is divided into plural sections, and all of electrodes disposed on the transmitting/receiving surface of each piezoelectric material and the surface confronting this transmitting/receiving surface are electrically connected through conductors, and since plural divided piezoelectric materials are provided, effects of undesired vibration mode are small, and therefore the ultrasonic transducer of high sensitivity, fast response, wide selection range of frequency and dimensions and small size is obtained, so that the ultrasonic flowmeter of high accuracy and compact size is realized.

In the invention, the flow passage is a parallel flow passage having a gap of a specified width at a specified position and having a specified height, and since the sectional shape of the flow passage is formed into a rectangular form, the flow velocity distribution in the section of the flow passage can be simplified, and the flow rate can be deduced at high accuracy from the obtained flow velocity, so that the ultrasonic flowmeter of high accuracy is realized.

Also in the invention, the conductors are sufficiently thin as compared with the wavelength of the ultrasonic wave generated from the ultrasonic transducer, and hence the electrodes can be connected without having effects on the characteristic of the ultrasonic transducer and handling of the piezoelectric material is easy, and therefore the ultrasonic transducer of high sensitivity and small size is obtained, so that the ultrasonic flowmeter of high accuracy is realized.

Further in the invention, the all lengths of the longitudinal and lateral sides of the transmitting/receiving surface of each piezoelectric material are set so that the vibration in the electrode direction vertical to the transmitting/receiving surface may be the main mode, and the ratio of the lengths of the longitudinal and lateral sides of the transmitting/receiving surface of each piezoelectric material to the thickness is all 0.8 or less, and therefore the thickness longitudinal vibration can be used as the main mode, and therefore the ultrasonic transducer of high sensitivity, fast response, wide selection range of frequency and dimensions and small size is obtained, so that the ultrasonic flowmeter of high accuracy and compact size is realized.

What is claimed is:

1. An ultrasonic transducer for use in a gas flowmeter comprising:
   a case having an inner surface; and
   a piezoelectric plate attached to the inner surface of the case, said piezoelectric plate to be covered with the case,
   wherein the piezoelectric plate is divided into a plurality of sections on a surface attaching to the inner surface of the case, the case is electrically conductive, and the case electrically connects among the divided surfaces of the plurality of sections.

2. An ultrasonic transducer according to claim 1, wherein said piezoelectric plate has another surface opposite to the surface attaching to the inner surface of the case, and an electrode is provided on said another surface.

3. An ultrasonic transducer according to claim 2, wherein the case has a ceiling, and the ceiling electrically connects among the divided surfaces of the plurality of sections.

4. An ultrasonic transducer according to claim 2, wherein said piezoelectric plate is divided into the plurality of sections by a groove.

5. An ultrasonic transducer according to claim 4, wherein the groove has a depth such that a vibration in a direction vertical to the surface attaching to the inner surface of the case is adapted to be a main vibration mode.

6. An ultrasonic transducer according to claim 5, wherein the depth of the groove is between 90% and 100% of a thickness of said piezoelectric plate in a direction vertical to the surface attaching to the inner surface of the case.

7. An ultrasonic transducer according to claim 4, wherein the depth of the groove is between 90% and 100% of a thickness of the piezoelectric plate in a direction vertical to the surface attaching to the inner surface of the case.

8. An ultrasonic transducer according to claim 4, wherein each length along longitudinal and lateral sides of each surface divided by the groove is set such that a vibration in a direction vertical to the surface attaching to the inner surface of the case is adapted to be a main vibration mode.

9. An ultrasonic transducer according to claim 8, wherein each ratio of the lengths of the longitudinal and lateral sides to the thickness is 0.8 or less.

10. An ultrasonic transducer according to claim 4, wherein a plurality of grooves are provided.

11. An ultrasonic transducer as in claim 4, wherein an acoustic matching layer is provided on at least one of the surfaces of the piezoelectric plate attached to the inner surface of the case and another surface opposite to the surface.

12. An ultrasonic transducer as in claim 4, wherein a backing layer is provided on at least one of the surfaces of the piezoelectric plate attaching to the inner surface of the case and another surface opposite to the surface.

13. An ultrasonic transducer as in claim 2, wherein an acoustic matching layer is provided on at least one of the surfaces of the piezoelectric plate attached to the inner surface of the case and another surface opposite to the surface.

14. An ultrasonic transducer as in claim 2, wherein a backing layer is provided on at least one of the surfaces of the piezoelectric plate attaching to the inner surface of the case and another surface opposite to the surface.

15. An ultrasonic transducer according to claim 1, wherein a thickness of a portion of the case which is attached to the piezoelectric plate is smaller than a wavelength of an ultrasonic wave produced by the ultrasonic transducer, said portion being attached to the piezoelectric plate.

16. An ultrasonic transducer as in claims 3 or 15, wherein an acoustic matching layer is provided on at least one of the surfaces of the piezoelectric plate attached to the inner surface of the case and another surface opposite to the surface.

17. An ultrasonic transducer as in claims 3 or 15, wherein a backing layer is provided on at least one of the surfaces of the piezoelectric plate attaching to the inner surface of the case and another surface opposite to the surface.

18. An ultrasonic transducer according to claim 15, wherein said piezoelectric plate is divided into a plurality of sections by a groove.

19. An ultrasonic transducer according to claim 18, wherein the groove has a depth such that a vibration in a direction vertical to the surface attaching to the inner surface of the case is adapted to be a main vibration mode.

20. An ultrasonic transducer according to claim 19, wherein the depth of the groove is between 90% and 100% of a thickness of said piezoelectric plate in a direction vertical to the surface attaching to the inner surface of the case.

21. An ultrasonic transducer according to claim 18, wherein the depth of the groove is between 90% and 100% of a thickness of the piezoelectric plate in a direction vertical to the surface attaching to the inner surface of the case.

22. An ultrasonic transducer according to claim 18, wherein each length along longitudinal and lateral sides of each surface divided by the groove is set such that a vibration in a direction vertical to the surface attaching to the inner surface of the case is adapted to be a main vibration mode.

23. An ultrasonic transducer according to claim 18 wherein a plurality of grooves are provided.

24. An ultrasonic transducer as in claim 18, wherein an acoustic matching layer is provided on at least one of the surfaces of the piezoelectric plate attached to the inner surface of the case and another surface opposite to the surface.

25. An ultrasonic transducer as in claim 18, wherein a backing layer is provided on at least one of the surfaces of the piezoelectric plate attaching to the inner surface of the case and another surface opposite to the surface.

26. An ultrasonic transducer for use in a gas flowmeter comprising:

a case having inner and outer surfaces;

a piezoelectric plate attached to the inner surface of the case, said piezoelectric plate to be covered with the case; and a matching layer corresponding to the piezoelectric plate, wherein the piezoelectric plate is divided into a plurality of sections on a surface attaching to the inner surface of the case, and the matching layer is provided on the outer surface of the case.

27. An ultrasonic transducer according to claim 26, wherein said piezoelectric plate has another surface opposite to said surface attaching to the inner surface of the case, and an electrode is provided on said another surface.

28. An ultrasonic transducer according to claim 27, wherein said case has a ceiling, and the ceiling electrically connects among the divided surfaces of the plurality of sections.

29. An ultrasonic transducer according to claim 27, wherein said piezoelectric plate is divided into the plurality of sections by a groove.

30. An ultrasonic transducer according to claim 26, wherein a thickness of a portion of the case which is attached to the piezoelectric plate is smaller than a wavelength of an ultrasonic wave produced by the ultrasonic transducer, said portion being attached to the piezoelectric plate.

31. An ultrasonic transducer according to claim 30, wherein said piezoelectric plate is divided into the plurality of sections by a groove.

32. An ultrasonic transducer according to claim 29 or 31, wherein the groove has a depth such that a vibration in a direction vertical to the surface attaching to the inner surface of the case is adapted to be a main vibration mode.

33. An ultrasonic transducer according to claim 32, wherein the depth of the groove is between 90% and 100% of a thickness of said piezoelectric plate in a direction vertical to the surface attaching to the inner surface of the case.

34. An ultrasonic transducer according to claim 29 or 31, wherein the depth of the groove is between 90% and 100% of a thickness of said piezoelectric plate in a direction vertical to the surface attaching to the inner surface of the case.

35. An ultrasonic transducer according to claim 29 or 31, wherein each length along longitudinal and lateral sides of each surface divided by the groove is provided such that a vibration in a direction vertical to the surface attaching to the inner surface of the case is adapted to be a main vibration mode.

36. An ultrasonic transducer according to claim 35, wherein each ratio of the lengths of the longitudinal and lateral sides to the thickness is 0.8 or less.

37. An ultrasonic transducer according to claim 29 or 31, wherein a plurality of grooves are provided.

38. An ultrasonic transducer as in any of claims 27 to 31, wherein a backing layer is provided on a surface of the piezoelectric plate opposite to the inner surface of the case through the piezoelectric plate.

* * * * *